(12) United States Patent
Ashrafi et al.

(10) Patent No.: US 9,998,763 B2
(45) Date of Patent: Jun. 12, 2018

(54) COMPRESSION OF SIGNALS, IMAGES AND VIDEO FOR MULTIMEDIA, COMMUNICATIONS AND OTHER APPLICATIONS

(71) Applicants: NxGen Partners IP, LLC, Dallas, TX (US); Nita Sue Linquist, Dallas, TX (US)

(72) Inventors: Solyman Ashrafi, Plano, TX (US); Roger D. Linquist, Dallas, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 0 days. days.

(21) Appl. No.: 15/087,540

(22) Filed: Mar. 31, 2016

(65) Prior Publication Data

US 2016/0295243 A1    Oct. 6, 2016

Related U.S. Application Data

(60) Provisional application No. 62/141,002, filed on Mar. 31, 2015.

(51) Int. Cl.
*H04N 19/63* (2014.01)
*H04N 19/18* (2014.01)
(Continued)

(52) U.S. Cl.
CPC ............ *H04N 19/63* (2014.11); *H04N 19/18* (2014.11); *H04N 19/182* (2014.11); *H04N 19/186* (2014.11); *H04N 19/91* (2014.11)

(58) Field of Classification Search
CPC ...................................................... H04N 19/63
(Continued)

(56) References Cited

U.S. PATENT DOCUMENTS 3,459,466 A    8/1969   Giordmaine
3,614,722 A    10/1971  Jones
(Continued)

OTHER PUBLICATIONS

Solyman Ashrafi, Channeling Radiation of Electrons in Crystal Lattices, Essays on Classical and Quantum Dynamics, Gordon and Breach Science Publishers, 1991.
(Continued)

*Primary Examiner* — Jonathan Messmore
(74) *Attorney, Agent, or Firm* — Munk Wilson Mandala, LLP

(57) ABSTRACT

A system and method for transmitting compressed image data includes an encoder, responsive to received image data representing an image, for minimizing a space-spatial frequency of the image data by applying a predetermined orthogonal function thereto to generate a mathematical representation of the image data and extracting coefficients of the mathematical representation of the image data. A transmitter transmits the coefficients of the image data from a first location to a second location. A receiver receives the transmitted coefficients of the image data at the second location from the first location. A decoder recreates the mathematical representation of the image data at the second location responsive to the received coefficients and the predetermined orthogonal function and generates the image data from the recreated mathematical representation of the image data.

25 Claims, 9 Drawing Sheets

(51) Int. Cl.
  *H04N 19/182* (2014.01)
  *H04N 19/186* (2014.01)
  *H04N 19/91* (2014.01)
(58) Field of Classification Search
  USPC .................................................. 375/240.19
  See application file for complete search history.

(56) References Cited

U.S. PATENT DOCUMENTS

| | | | |
|---|---|---|---|
| 4,379,409 | A | 4/1983 | Primbsch et al. |
| 4,503,336 | A | 3/1985 | Hutchin et al. |
| 4,736,463 | A | 4/1988 | Chavez |
| 4,862,115 | A | 8/1989 | Lee et al. |
| 5,051,754 | A | 9/1991 | Newberg |
| 5,220,163 | A | 6/1993 | Toughlian et al. |
| 5,222,071 | A | 6/1993 | Pezeshki et al. |
| 5,272,484 | A | 12/1993 | Labaar |
| 5,543,805 | A | 8/1996 | Thaniyavarn |
| 5,555,530 | A | 9/1996 | Meehan |
| 6,337,659 | B1 | 1/2002 | Kim |
| 6,992,829 | B1 | 1/2006 | Jennings et al. |
| 7,577,165 | B1 | 8/2009 | Barrett |
| 7,729,572 | B1 | 6/2010 | Pepper et al. |
| 7,792,431 | B2 | 9/2010 | Jennings et al. |
| 8,432,884 | B1 | 4/2013 | Ashrafi |
| 8,503,546 | B1 | 8/2013 | Ashrafi |
| 8,559,823 | B2 | 10/2013 | Izadpanah et al. |
| 8,811,366 | B2 | 8/2014 | Ashrafi |
| 9,077,577 | B1 | 7/2015 | Ashrafi |
| 2005/0254826 | A1 | 11/2005 | Jennings et al. |
| 2005/0259914 | A1 | 11/2005 | Padgett et al. |
| 2008/0144942 | A1* | 6/2008 | Besley ............... G06K 9/6204 382/209 |
| 2010/0013696 | A1 | 1/2010 | Schmitt et al. |
| 2010/0146027 | A1* | 6/2010 | Dao .................... G06F 11/08 708/491 |
| 2010/0309974 | A1* | 12/2010 | Reznik ............... G06F 17/147 375/240.2 |
| 2012/0033949 | A1* | 2/2012 | Lu ...................... G11B 27/034 386/285 |
| 2012/0044979 | A1* | 2/2012 | Boasson ............. H04L 1/0045 375/222 |
| 2012/0207470 | A1 | 8/2012 | Djordevic et al. |
| 2013/0027774 | A1 | 1/2013 | Bovino et al. |
| 2013/0235744 | A1 | 9/2013 | Chen et al. |
| 2014/0003705 | A1* | 1/2014 | Taguchi .............. G06T 7/0032 382/154 |
| 2014/0355624 | A1 | 12/2014 | Li et al. |
| 2015/0098697 | A1 | 4/2015 | Marom et al. |

OTHER PUBLICATIONS

Solyman Ashrafi, Solar Flux Forecasting Using Mutual Information with an Optimal Delay, Advances in the Astronautical Sciences, American Astronautical Society, vol. 84 Part II, 1993.
Solyman Ashrafi, PCS system design issues in the presence of microwave OFS, Electromagnetic Wave Interactions, Series on Stability, Vibration and Control of Systems, World Scientific, Jan. 1996.
Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).
Solyman Ashrafi, Optical Communications Using Orbital Angular Momentum Beams, Adv. Opt. Photon. 7, 66-106, Advances in Optics and Photonic, 2015.
Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).
Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.
Solyman Ashrafi, Link Analysis of Using Hermite-Gaussian Modes for Transmitting Multiple Channels in a Free-Space Optical Communication System, The Optical Society, vol. 2, No. 4, Apr. 2015.
Solyman Ashrafi, Performance Metrics and Design Considerations for a Free-Space Optical Orbital-Angular-Momentum Multiplexed Communication Link, The Optical Society, vol. 2, No. 4, Apr. 2015.
Solyman Ashrafi, Demonstration of Distance Emulation for an Orbital-Angular-Momentum Beam. OSA Technical Digest (online), paper STh1F.6. The Optical Society, 2015.
Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.
Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.
Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.
Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.
Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.
Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).
Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.
Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).
Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.
Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.
Solyman Ashrafi, An Information Theoretic Framework to Increase Spectral Efficiency, IEEE Transactions on Information Theory, vol. XX, No. Y, Oct. 2014, Dallas, Texas.
Solyman Ashrafi, Acoustically induced stresses in elastic cylinders and their visualization, The Journal of the Acoustical Society of America 82(4):1378-1385, Sep. 1987.
Solyman Ashrafi, Splitting of channeling-radiation peaks in strained-layer superlattices, Journal of the Optical Society of America B 8(12), Nov. 1991.
Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.

(56) References Cited

OTHER PUBLICATIONS

Solyman Ashrafi, Orbital-Angular-Momentum-Multiplexed Free-Space Optical Communication Link Using Transmitter Lenses, Applied Optics, vol. 55, No. 8, pp. 2098-2103, 2016.

Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).

Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).

Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).

Solyman Ashrafi, Demonstration of OAM-based MIMO FSO link using spatial diversity and MIMO equalization for turbulence mitigation, IEEE/OSA Conference on Optical Fiber Communications (OFC), paper Th1H.2, Anaheim, CA, Mar. 2016 (Optical Society of America, Washington, D.C., 2016).

Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.

Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.

Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-Optics (CLEO), paper SW4M.5, San Jose, CA, May 2015 (OSA, Wash., D.C., 2015).

Solyman Ashrafi, Spurious Resonances and Modelling of Composite Resonators, 37th Annual Symposium on Frequency Control, 1983.

Solyman Ashrafi, Splitting and contrary motion of coherent bremsstrahlung peaks in strained-layer superlattices, Journal of Applied Physics 70:4190-4193, Dec. 1990.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), paper 2480002, San Jose, CA, Jun. 2016 (OSA, Wash., D.C., 2016).

Solyman Ashrafi, Combining Schatten's Solar Activity Prediction Model with a Chaotic Prediction Model, National Aeronautics and Space Administration, Nov. 1991.

Solyman Ashrafi, Detecting and Disentangling Nonlinear Structure from Solar Flux Time Series, 43rd Congress of the International Astronautical Federation, Aug. 1992.

Solyman Ashrafi, Physical Phaseplate for the Generation of a Millimeter-Wave Hermite-Gaussian Beam, IEEE Antennas and Wireless Propagation Letters, RWS 2016; pp. 234-237.

Solyman Ashrafi, Future Mission Studies: Forecasting Solar Flux Directly From Its Chaotic Time Series, Computer Sciences Corp., Dec. 1991.

Solyman Ashrafi, CMA Equalization for a 2 Gb/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).

Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).

Solyman Ashrafi, Evidence of Chaotic Pattern in Solar Flux Through a Reproducible Sequence of Period-Doubling-Type Bifurcations; Computer Sciences Corporation (CSC); Flight Mechanics/ Estimation Theory Symposium; NASA Goddard Space Flight Center; Greenbelt, Maryland; May 21-23, 1991.

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

H. Yao et al, Patch Antenna Array for the Generation of Millimeter-wave Hermite-Gaussian Beams, IEEE Antennas and Wireless Propagation Letters; 2016.

Yongxiong Ren et al, Experimental Investigation of Data Transmission Over a Graded-index Multimode Fiber Using the Basis of Orbital Angular Momentum Modes.

Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).

Li, X. et al.; Investigation of interterence in multiple-input multiple-output wireless transmission at W band for an optical wireless integration system. Optics Letters 38, 742-744 (2013).

Padgett, Miles J. et al., Divergence of an orbital-angular-momentum-carrying beam upon propagation. New Journal of Physics 17, 023011 (2015).

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).

Vasnetsov, M. V., Pasko, V.A. & Soskin, M.S.; Analysis of orbital angular momentum of a misaligned optical beam; New Journal of Physics 7, 46 (2005).

Byun, S.H., Haji, G.A. & Young, L.E.; Development and application of GPS signal multipath simulator; Radio Science, vol. 37, No. 6, 1098 (2002).

Tamburini, Fabrizio; Encoding many channels on the same frequency through radio vorticity: first experimental test; New Journal of Physics 14, 033001 (2012).

Gibson, G. et al., Free-space information transfer using light beans carrying orbital angular momentum; Optical Express 12, 5448-5456 (2004).

Yan, Y. et al.; High-capacity millimetre-wave communications with orbital angular momentum multiplexing; Nature Communications; 5, 4876 (2014).

Hur, Sooyoung et at.; Millimeter Wave Beamforming for Wireless Backhaul and Access in Small Cell Networks. IEEE Transactions on Communications, vol. 61, 4391-4402 (2013).

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).

Anderson, Jorgen Bach; Rappaport, Theodore S.; Yoshida, Susumu; Propagation Measurements and Models for Wireless Communications Channels; 33 42-49 (1995).

Iskander, Magdy F.; Propagation Prediction Models for Wireless Communication Systems; IEEE Transactions on Microwave Theory and Techniques, vol. 50., No. 3, 662-673 (2002).

Wang, Jian, et al.; Terabit free-space data transmission employing orbital angular momentum multiplexing. Nature Photonics; 6, 488-496 (2012).

Katayama, Y., et al.; Wireless Data Center Networking with Steered-Beam mmWave Links; IEEE Wireless Communication Network Conference; 2011, 2179-2184 (2011).

Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).

(56) References Cited

OTHER PUBLICATIONS

Rapport, T.S.; Millimeter Wave Mobile Communications for 5G Cellular: It Will Work!; IEEE Access, 1, 335-349 (2013).

* cited by examiner

COMPRESSION OF SIGNALS, IMAGES AND VIDEO FOR MULTIMEDIA, COMMUNICATIONS AND OTHER APPLICATIONS

CROSS-REFERENCE TO RELATED APPLICATIONS

This application claims benefit of U.S. Provisional Application No. 62/141,002, filed Mar. 31, 2015, entitled COMPRESSION OF SIGNALS, IMAGES AND VIDEO FOR MULTIMEDIA, COMMUNICATIONS AND OTHER APPLICATIONS, the specification of which is incorporated by reference herein in its entirety.

TECHNICAL FIELD

The present invention relates to image/video compression, and more particularly, to the compression of image/video using moments created from orthogonal functions.

BACKGROUND

As the use of portable and electronic mobile devices has increased, the use of various image and video streaming applications have placed increased demands upon the available bandwidth in order to transmit the image and video data associated with increased number of these data intensive applications. Applications for the viewing of movies, television, sporting events etc. provide ever increasing needs for greater bandwidth in order to sufficiently transmit all of the image data associated with these applications.

The transmission of image and video data requires a great deal of bandwidth to provide the information over a wireless or wireline connection. Present compression techniques involve the transmission of subsets of data and then reconstructing all of the data at a receiving location in order to regenerate the image or video. Data intensive applications such as streaming video would be greatly benefited by improved compression techniques that allow images and video to be substantially transmitted to a receiving location while only actually transmitting a small subset of the overall data that is used for creating the image or video. Thus, improved image and video compression techniques are needed.

SUMMARY

The present invention, as disclosed and describe herein, in on aspect thereof, comprises a system and method for transmitting compressed image data that includes an encoder, responsive to received image data representing an image, for minimizing a space-spatial frequency of the image data by applying a predetermined orthogonal function thereto to generate a mathematical representation of the image data and extracting coefficients of the mathematical representation of the image data. A transmitter transmits the coefficients of the image data from a first location to a second location. A receiver receives the transmitted coefficients of the image data at the second location from the first location. A decoder recreates the mathematical representation of the image data at the second location responsive to the received coefficients and the predetermined orthogonal function and generates the image data from the recreated mathematical representation of the image data.

BRIEF DESCRIPTION OF THE DRAWINGS

For a more complete understanding, reference is now made to the following description taken in conjunction with the accompanying Drawings in which.

DETAILED DESCRIPTION

Figure 1:
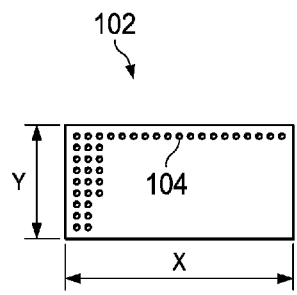
FIG. 1 illustrates an X by Y single image array.

Referring now to the drawings, wherein like reference numbers are used herein to designate like elements throughout, the various views and embodiments of the compression of signals images and video in multi-media, communications and other applications are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a single video image 102. The video image 102 consists of an X by Y array of pixels 104. Each of these pixels have particular height and/or color characteristics associated therewith that when they are placed together provide a single image that may be distinguished by the human eye. The individual pixels 104 may have various red green blue values associated there with in order to determine color or may also utilize luminescence and chroma values as another way of distinguishing color. Purely black and white images can be distinguished by associating various grayscale values with each of the pixels.

Figure 2:
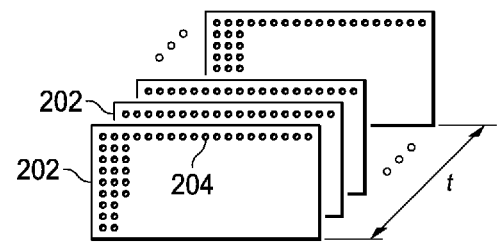
FIG. 2 illustrates a series of X by Y images comprising a video.

Referring now also to FIG. 2, there is illustrated a series of images 202 that are each made up of an X by Y array of pixels 204 each of the images 202 are separated in time (t) such that when viewed sequentially provide a moving image. Each of the single image of FIG. 1 and the multiple images of FIG. 2 require the transmission of data with respect to each of the pixels within either the single image or multiple images. Thus, in a 1920×1080 image each of these pixels must have data transmitted with respect thereto and each of these pixels can be represented by multiple bits to illustrate the color and light intensity of the pixel. This can require the transmission of a large amount of data that cannot practically be done using most available wireline and wireless bandwidth currently available. Thus, various compression techniques are utilized in order to carry out the transmission of this information.

Techniques for Compression of signals, Image and Video

In this system and method, two theoretical constructs are leveraged from classical mechanics and from quantum mechanics for image compression and pattern recognition. The two theoretical constructs from classical mechanics include the concept of moment of inertia and the use of quaternions. The theoretical construct from quantum mechanics is the use of minimization of space-spatial frequency which would result in a Schrodinger-type equation with a harmonic oscillator potential with solutions that correspond to Hermite-Gaussian basis functions used for calculations of the moments. These techniques can be used for video compression as well as signals from life sciences (QRS signals from EKG, brain waves as well as DNA information).

Figure 3:
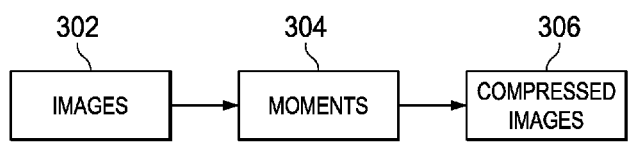
FIG. 3 illustrates the manner in which moments may be used for compressing image data.

Thus, as illustrated in FIG. 3, images 302 utilize various types of moments 304 in order to generate compressed images 306. The use of moments enables the minimization of space-spatial frequency for the image 302 to provide the compressed images 306 using Hermite Gaussian functions as a basis for the compression function. While the use of Hermite-Gaussian functions is described, it will be realized that other types of orthogonal functions may also be utilized as the basis function for compression of the images 302 and the determination of moments 304 for the compressed images 306. The orthogonal functions may be generated and applied in the manner disclosed in U.S. Pat. No. 9,077,577, and any continuations thereof, the specifications of which are incorporated herein by reference in their entirety.

The principal techniques of Moment Invariants, Geometric Moments, Rotational Moments, Orthogonal Moments and Complex Moments may be used for image compression. Various forms of moment descriptors are used for data compression. Though the mathematical concept of moments has been around for many years and has been used in many diverse fields ranging from mechanics to statistics, their utility in image and video compression along with Hermite-Gaussian basis functions and quaternions have not been utilized. Describing images with moments allow the extract the global properties of the image and with such information, more efficient compression is possible for both one dimensional signals (life sciences) as well as two dimensional images and three dimensional video.

Minimization of Space-Spatial Frequency for Image Compression

The minimization of space-spatial frequency product results in a Schrodinger-type equation which minimizes such a product. To do that, it would be convenient to express signal amplitude e(s) as a function of space s in a complex form close to quantum mechanical formalism. Therefore the complex signal can be represented as:

$$\psi(s) = e(s) + j\sigma(s)$$

where $s(r) \equiv$ real signal $\sigma(s) \equiv$ imagenary signal (quadrature)

$$\sigma(s) = \frac{1}{\pi} \int_{-\infty}^{\infty} s(r) \frac{dr}{r-s}$$

$$e(s) = -\frac{1}{\pi} \int_{-\infty}^{\infty} \sigma(s) \frac{dr}{r-s}$$

Where e(s) and σ(s) are Hilbert transforms of one another and since σ(s) is quadrature of e(s), they have similar spectral components. That is if they were the amplitudes of sound waves, the ear could not distinguish one from the other.

The Fourier transform pairs are defined as follows:

$$\psi(s) = \frac{1}{\pi} \int_{-\infty}^{\infty} \varphi(k) e^{j2\pi ks} dk$$

$$\varphi(k) = \frac{1}{\pi} \int_{-\infty}^{\infty} \psi(s) e^{-j2\pi s} ds$$

$$\psi^*(s)\psi(s) = [e(s)]^2 + [\sigma(s)]^2 + \ldots \equiv \text{signal power}$$

All moments are normalized to $M_0$ $$M_0 = \int_0^r e(s) ds$$

$$M_0 = \int_0^r \varphi^* \varphi \, dk$$

Then the moments are as follows:

$$M_0 = \int_0^r e(s) ds$$

$$M_1 = \int_0^r s e(s) ds$$

$$M_2 = \int_0^r s^2 e(s) ds$$

$$M_{N-1} = \int_0^r s^{N-1} e(s) ds$$

In general, one can consider the signal e(s) be represented by a polynomial of order N, to fit closely to e(s) and use the coefficient of the polynomial as representation of data. This is equivalent to specifying the polynomial in such a way that its first N "moments" $M_j$ shall represent the data. That is, instead of the coefficient of the polynomial, the moments can be used. Another method is to expand the signal e(s) in terms of a set of N orthogonal functions $\varphi_k(s)$, instead of powers of space. Here, the data can be considered to be the coefficients of the orthogonal expansion. One class of such orthogonal functions are sine and cosine functions (like in Fourier series).

Therefore, the above moments can now be represented using the orthogonal function ψ with the following moments:

$$\bar{s} = \frac{\int \psi^*(s) s \psi(s) ds}{\int \psi^*(s) \psi(s) ds}$$

$$\bar{s}^2 = \frac{\int \psi^*(s) s^2 \psi(s) ds}{\int \psi^*(s) \psi(s) ds}$$

$$\bar{s}^n = \frac{\int \psi^*(s) s^n \psi(s) dt}{\int \psi^*(s) \psi(s) ds}$$

Similarly:

$$\bar{k} = \frac{\int \varphi^*(k) k \varphi(k) dk}{\int \varphi^*(k) \varphi(k) dk}$$

$$\bar{k}^2 = \frac{\int \varphi^*(k) k^2 \varphi(k) dk}{\int \varphi^*(k) \varphi(k) dk}$$

$$\bar{f}^n = \frac{\int \varphi^*(f) f^n \varphi(f) df}{\int \varphi^*(f) \varphi(f) df}$$

If the complex signal is not used, then:

$$\bar{k} = 0$$

To represent the mean values from space to wave number domains, replace $$\psi(s) \to \varphi(k)$$

$$s \to -\frac{1}{2\pi j} \frac{d}{dk}$$

Conversely to represent the mean values from wave number to space domains, replace $$\varphi(k) \to \psi(s)$$

$$k \to \frac{1}{2\pi j} \frac{d}{ds}$$

These are equivalent to somewhat mysterious rule in quantum mechanics where classical momentum becomes an operator $$P_x \to \frac{h}{2\pi j} \frac{\partial}{\partial s}$$

Therefore using the above substitutions:

$$\bar{k} = \frac{\int \varphi^*(k) k \varphi(k) dk}{\int \varphi^*(k) \varphi(k) dk} = \frac{\int \psi^*(s) \left( \frac{1}{2\pi j} \right) \frac{d\psi(s)}{ds} ds}{\int \psi^*(s) \psi(s) ds}$$

$$= \left( \frac{1}{2\pi j} \right) \frac{\int \psi^* \frac{d\psi}{ds} ds}{\int \psi^* \psi ds}$$

And $$\bar{k}^2 = \frac{\int \varphi^*(k) k^2 \varphi(k) dk}{\int \varphi^*(k) \varphi(k) dk} = \frac{\int \psi^* \left( \frac{1}{2\pi j} \right)^2 \frac{d^2}{dt^2} ds}{\int \psi^* \psi ds}$$

$$= -\left( \frac{1}{2\pi} \right)^2 \frac{\int \psi^* \frac{d^2}{ds^2} \psi ds}{\int \psi^* \psi ds}$$

$$\bar{s}^2 = \frac{\int \psi^* s^2 \psi ds}{\int \psi^* \psi ds}$$

An effective extension and effective wave number is defined as $$\Delta s = \sqrt{\overline{2\pi (s - \bar{s})^2}} = 2\pi \cdot \text{rms in space}$$

$$\Delta k = \sqrt{\overline{2\pi (k - \bar{k})^2}} = 2\pi \cdot \text{rms in wave number}$$

But $$\overline{(s - \bar{s})^2} = \bar{s}^2 - (\bar{s})^2$$

$$\overline{(k - \bar{k})^2} = \bar{k}^2 - (\bar{k})^2$$

The following substitutions simplify the equations:

$$r = s - \bar{s}$$

$$\psi(r) = \psi(s) e^{-j 2\pi \bar{k} r}$$

$$2\pi \bar{k} = 2\pi k_0$$

Additionally, $$(\Delta s)^2 (\Delta k)^2 = (\Delta s \Delta k)^2$$

and therefore $$(\Delta s \Delta k)^2 = \frac{1}{4} \left[ 4 \frac{\int \Psi^*(r) r^2 \Psi(r) dr \int \frac{d\Psi^*}{dr} \frac{d\Psi}{dr} dr}{\left( \int \Psi^*(r) \psi(r) dr \right)^2} \right] \geq \left( \frac{1}{4} \right)$$

$$(\Delta s \Delta k) \geq \left( \frac{1}{2} \right)$$

Now instead of $$(\Delta s \; \Delta k) \geq \left( \frac{1}{2} \right)$$

to force the equality use $$(\Delta s \quad \Delta k) = \left(\frac{1}{2}\right)$$

and see what signals satisfy the equality.

Given a fixed $\Delta k$, the minimized wave formation is one that minimizes the divergence-extension product $$(\Delta s \quad \Delta k) = \left(\frac{1}{2}\right).$$

For a given $\Delta k$, the signal that minimizes the wave formation in minimum space will be a Gaussian envelope. Now, what is the signal shape with shortest effective space and spatial frequency?

$$\Delta s = = \frac{\frac{1}{(2\pi)^2}\int_{f_1}^{f_2}\frac{d\varphi^*}{dk}\frac{d\varphi}{dk}}{\int_{f_1}^{f_2}\varphi^*\varphi dk} \to \min$$

Where $\varphi(k)$ is zero outside the range $k_2$–$k_1$.

To do the minimization, use the calculus of variations (Lagrange's Multiplier technique). Note that the denominator is constant and therefore only need to minimize the numerator as:

$$\Delta s \to \min \to \delta \int_{f_1}^{f_2}\left(\frac{d\varphi^*}{dk}\frac{d\varphi}{dk} + \Lambda\varphi^*\varphi\right)dk = 0$$

First *Trem*

$$\delta \int_{f_1}^{f_2}\frac{d\varphi^*}{dk}\frac{d\varphi}{dk}dk = \int\left(\frac{d\varphi^*}{dk}\delta\frac{d\varphi}{dk} + \frac{d\varphi}{dk}\delta\frac{d\varphi^*}{dk}\right)dk$$

$$= \int\left(\frac{d\varphi^*}{dk}\frac{d\delta\varphi}{dk} + \frac{d\varphi}{dk}\frac{d\delta\varphi^*}{dk}\right)dk$$

$$= \left[\frac{d\varphi^*}{dk}\delta\varphi + \frac{d\varphi}{dk}\delta\varphi^*\right]_{k_1}^{k_2} -$$

$$\int\left(\frac{d^2\varphi^*}{dk^2}\delta\varphi + \frac{d^2\varphi}{dk^2}\delta\varphi^*\right)dk$$

$$= \int\left(\frac{d^2\varphi^*}{dk^2}\delta\varphi + \frac{d^2\varphi}{dk^2}\delta\varphi^*\right)dk$$

Second *Trem*

$$\delta\int_{k_1}^{k_2}(\Lambda\varphi^*\varphi)df = \Lambda\int_{k_1}^{k_2}(\varphi^*\delta\varphi + \varphi\delta\varphi^*)dk$$

Both *Trems*

$$= \int\left[\left(\frac{d^2\varphi^*}{dk^2} + \Lambda\varphi^*\right)\delta\varphi + \left(\frac{d^2\varphi}{dk^2} + \Lambda\varphi\right)\delta\varphi^*\right]dk = 0$$

This is only possible if and only if $$\left(\frac{d^2\varphi}{dk^2} + \Lambda\varphi\right) = 0$$

The solution to this is of the form $$\varphi(k) = \sin k\pi\left(\frac{k - k_1}{k_2 - k_1}\right)$$

Now if the minimum space-spatial frequency product is required to be:

$$(\Delta s \quad \Delta k) = \left(\frac{1}{2}\right)$$

Then, the wave equation of a Harmonic Oscillator is:

$$\frac{d^2\Psi(\tau)}{dr^2} + (\lambda - \alpha^2 r^2)\Psi(r) = 0$$

which vanishes at infinity only if $$\lambda = \alpha(2n + 1)$$

$$\psi_n = e^{-\frac{1}{2}(2\pi k)^2 r^2}\frac{d^n}{dr^n}e^{-\alpha^2 r^2} \propto H_n(r)$$

Where $H_n(\tau)$ is the Hermit functions and $$(\Delta s \quad \Delta k) = \left(\frac{1}{2}\right)(2n + 1)$$

So Hermit functions $H_n(r)$ occupy blocks the minimum space-spatial frequency product.

Moments of Image

Figure 4:
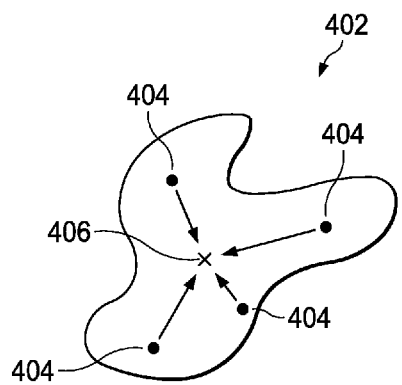
FIG. 4 illustrates moments of an image being compared to a central moment.

In low-level image processing techniques operators act on the individual pixels of an image and pixels are treated analogously to mass points. As such, each pixel is considered to have an associated moment references to a central moment. These are here treated within a Hermite Gaussian (HG) moment framework. Referring now to FIG. 4, there is illustrated an image 402 including a number of pixels 404 having moments associated therewith and a central moment 406. First, a central moments 406 description is given followed by a listing of several possible orthogonal moments 404 which add individual components of each polynomial order to construct images. These include pseudo-Zernike, Legendre, Krawtchouk, and Hermite Gaussian moments.

Next, descriptions are provided for both continuous and discrete HG moment frameworks in one- and two-dimensions. The one-dimensional HG moment framework has applications in monitoring such phenomena as a QRS heartbeat signature while the two-dimensional framework has applications in digital image compression. The latter may also be extended to video compression.

Figure 5:
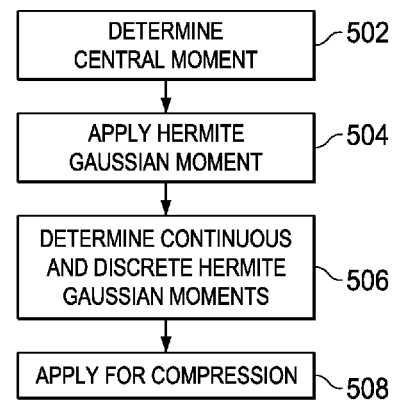
FIG. 5 is a flow diagram illustrating a method for compressing an image using Hermite Gaussian moments.

Referring now to FIG. 5, there is illustrated the manner in which moments may be used for the compression of images. The central moment of an image is initially determined at step 502. The central moment comprises the central portion of the image 402 illustrated generally at 406 in FIG. 4. Next, Hermite Gaussian moments are applied at step 504 to each of the other moments (pixels) with respect to the central moment 406. This is used to determine the continuous and discrete Hermite Gaussian moments at step 506 with respect to each moment 404 within an image. The determined moments may then be applied for purposes of compressing the image data at step 508.

Geometric and Complex Moments

Using geometric moments (GMs) as a basic tool for the purpose of image processing has several advantages over other orthogonal moments. The focus of most of the work has been on the orthogonal moments, but a lot of them have tried to describe the orthogonal moments in terms of GMs as a linear combination. In this section, some of the basic concepts are reviewed, and complementary ones are proposed.

An image is a real discrete 2D function with size N×M. The GM of order (p, q) of an image I(x, y) in the spatial domain is defined by:

$$m_{pq} = \sum_{x=1}^{N} \sum_{y=1}^{M} x^p y^q I(x, y)$$

The complex moments (CMs) of order (p, q) of the same image in the spatial domain are defined by:

$$C_{pq} = \sum_{x=1}^{N} \sum_{y=1}^{M} (x+iy)^p (x-iy)^q I(x, y)$$

Where $i=\sqrt{-1}$. The relationship between CMs and GMs can be obtained by:

$$C_{pq} = \sum_{k=0}^{p} \sum_{l=0}^{q} \binom{p}{k}\binom{q}{l} (-1)^{q-l} i^{p+q-k-l} m_{k+l, p+q-k-l}.$$

The inverse relationship between GMs and CMs can be obtained as follows $$m_{pq} = \sum_{k=0}^{p} \sum_{l=0}^{q} \binom{p}{k}\binom{q}{l} \frac{(-1)^{q-l}}{2^{p+q} i^q} C_{k+l, p+q-k-l}$$

These last two equations may be achieved from binomial expansion of the complex kernels in the third equation above.

The discrete Fourier transform (DFT) of an image is defined by:

$$F(u, v) = \sum_{x=0}^{N-1} \sum_{y=0}^{M-1} I(x, y) e^{-2\pi i \left(\left(\frac{ux}{N}\right) + \left(\frac{vy}{M}\right)\right)}$$

The corresponding inverse discrete Fourier transform (IFT) is defined by:

$$I(x, y) = \frac{1}{NM} \sum_{u=0}^{N-1} \sum_{v=0}^{M-1} F(u, v) e^{i2\pi \left(\left(\frac{ux}{N}\right) + \left(\frac{vy}{M}\right)\right)}.$$

Various algorithms may be used for fast computation of HG moments as there are for other types of moments.

The gravity center over the domain [−1,1] of I(i, j) can be determined by geometric moments of order 0 and 1, [Li11, Ya14]

$$\bar{x} = \frac{m_{10}}{m_{00}} = \frac{\sum_{i=0}^{K-1} \sum_{j=0}^{K-1} x \cdot I(i, j)}{\sum_{i=0}^{K-1} \sum_{j=0}^{K-1} I(i, j)},$$

$$\bar{y} = \frac{m_{01}}{m_{00}} = \frac{\sum_{i=0}^{K-1} \sum_{j=0}^{K-1} y \cdot I(i, j)}{\sum_{i=0}^{K-1} \sum_{j=0}^{K-1} I(i, j)}$$

Therefore, the central Hermite Gaussian moments of I(i, j) is defined as:

$$\eta_{pq} = \frac{4}{(K-1)^2} \sum_{i=0}^{K-1} \sum_{j=0}^{K-1} \hat{H}_p\left(\frac{x-\bar{x}}{\sigma}\right) \hat{H}_q\left(\frac{y-\bar{y}}{\sigma}\right) I(i, j)$$

Or $$\eta_{pq} = \int_{-\infty}^{\infty} \int_{-\infty}^{\infty} \hat{H}_p\left(\frac{x-\bar{x}}{\sigma}\right) \hat{H}_q\left(\frac{y-\bar{y}}{\sigma}\right) I(x, y) dx dy$$

Where $\bar{x}=m_{10}/m_{00}$ and $\bar{y}=m_{01}/m_{00}$ are computed by the geometric moments $$m_{pq} = \int_{-\infty}^{\infty} \int_{-\infty}^{\infty} x^p y^q I(x, y) dx dy$$

Central Moments

Central moments 406 are given by:

$$\mu_{pq} = \int_{-\infty}^{\infty} \int_{-\infty}^{\infty} (x-\bar{x})^p (y-\bar{y})^q \rho(x, y) d(x-\bar{x}) d(y-\bar{y})$$

where $\bar{x}=m_{10}/m_{00}$ and $\bar{y}=m_{01}/m_{00}$. This spatial description of moments may be used in image processing.

For simplicity of description, all moments 404 may be written in reference to central moments 406 such that, $\mu_{pq}$ may be written as:

$$\mu_{pq} = \int_{-\infty}^{\infty} \int_{-\infty}^{\infty} x^p y^q \rho(x, y) dx dy.$$

Hermite Gaussian Frameworks

Continuous One-Dimensional HG

The Hermite polynomial of degree p is defined over the domain (−∞, ∞) by:

$$H_p(x) = (-1)^p \exp(x^2) \left(\frac{d^p}{dx^p}\right) \exp(-x^2)$$

These polynomials are orthogonal with respect to the Gaussian weight function $\exp(-x^2)$ and their orthogonality is then given by:

$$\int_{-\infty}^{\infty} \exp(-x^2) H_p(x) H_q(x) dx = 2^p p! \sqrt{\pi}\, \delta_{pq}$$

where the Kronecker delta is given by $$\delta_{pq} = \begin{cases} 0 & p \neq q \\ 1 & p = q \end{cases}.$$

Any orthogonal set has recurrence formulae relating any three consecutive polynomials in the set. The recursive calculation of Hermite polynomials is $$H_{p+1} = 2x \cdot H_p(x) - 2p \cdot H_{p-1}(x) \text{ for } p \geq 2$$

with initial conditions $H_0(x)=1$ and $H_1(x)=2x$.

The normalized Hermite polynomials are then given by $$\hat{H}_p(x) = \frac{1}{\sqrt{2^p p! \sqrt{\pi}}} \exp\left(-\frac{x^2}{2}\right) H_p(x)$$

which gives $$\int_{-\infty}^{\infty} \hat{H}_p(x) \hat{H}_q(x) dx = \delta_{pq}.$$

Figure 6:
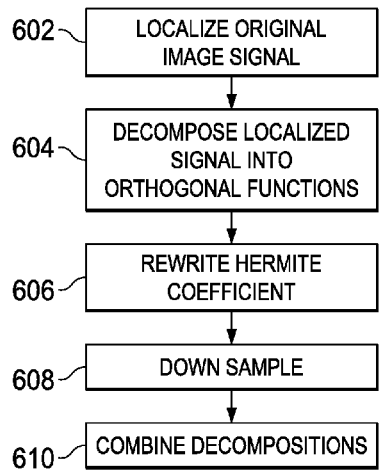
FIG. 6 is a flow diagram illustrating a Hermite transform.

FIG. 6 illustrates graphs of some normalized Hermite polynomials of different degrees.

Replacing $x \to x/\sigma$, the Hermite Gaussian functions are $$\hat{H}_p\left(\frac{x}{\sigma}\right) = \frac{1}{\sqrt{2^n p! \sqrt{\pi}\, \sigma}} \exp\left(\frac{-x^2}{2\sigma^2}\right) H_p\left(\frac{x}{\sigma}\right).$$

Based on these functions, the Hermite Gaussian moment of order p+q of the continuous image function $I(x, y)$ could be defined by:

$$M_{pq} = \int_{-\infty}^{\infty} \int_{-\infty}^{\infty} I(x, y) \hat{H}_p\left(\frac{x}{\sigma}\right) \hat{H}_q\left(\frac{y}{\sigma}\right) dx dy$$

Since the basis functions are not only orthogonal, but also normalized, Hermite Gaussian moments are called "orthonormal".

Given the Gaussian smoothing function $$g(x, \sigma) = (2\pi\sigma^2)^{-\frac{1}{2}} \exp\left(-\frac{x^2}{2\sigma^2}\right)$$

The nth order smoothed Hermite Gaussian moments of a signal $s(x)$ are defined as:

$$M^n(x, s(x)) = \int_{-\infty}^{\infty} B_n(\mathfrak{X}) s(x + \mathfrak{X}) d\mathfrak{X} \quad (n = 0, 1, 2, \dots)$$

with $$B_n(\mathfrak{X}) = g(\mathfrak{X}, \sigma) P_n(\mathfrak{X})$$

where $$P_n(\mathfrak{X}) = H_n(\mathfrak{X}/\sigma) = (-1)^n \exp(\mathfrak{X}^2) \left(\frac{d^n}{d\mathfrak{X}^n}\right) \exp(-\mathfrak{X}^2)$$

are scaled Hermite polynomial functions of order n.

The Hermite Gaussian moments may be recursively calculated as follows:

$$M_n(x, s^{(m)}(x)) = 2(n-1) M_{n-2}(x, s^{(m)}(x)) + 2\sigma M_{n-1}(x, s^{(m+1)}(x))$$

For $m \geq 0$ and $n \geq 2$ with $$M_0(x, s^{(m)}(x)) = g(x, \sigma) * s^{(m)}(x) \text{ for } m \geq 0$$

$$M_1(x, s^{(m)}(x)) = \frac{2\sigma d[g(x, \sigma)]}{dx} * s^{(m)}(x)$$

and in particular, $$M_0(x, s(x)) = g(x, \sigma) * s(x)$$

$$M_1(x, s(x)) = \frac{2\sigma d[g(x, \sigma) * s(x)]}{dx}$$

where $$s^m(x) = d^m s(x)/dx^m$$

$$s^0(x) = s(x)$$

and * denotes the convolution operator.

Moreover, from the recursive calculation of Hermite-Gaussian moments (HGMs), these moments are in fact linear combinations of the derivatives of the signal filtered by a Gaussian filter. As is well known, the derivatives have been extensively used for image representation in pattern recognition.

2D orthogonal Hermite Gaussian moments of order (p, q) of an input image $I(x, y)$ can be defined similarly $$M_{p,q} = \int\int_{-\infty}^{\infty} G(\mathfrak{X}, v, \sigma) H_{p,q}\left(\frac{\mathfrak{X}}{\sigma}, \frac{v}{\sigma}\right) S(x + \mathfrak{X}, y + \mathfrak{X}) d\mathfrak{X} dv$$

Where $G(\mathfrak{X}, v, \sigma)$ is the 2D Gaussian function, and $H_{pq}(\mathfrak{X}/\sigma, v/\sigma)$ is the scaled 2D Hermite polynomial of order (p, q), with $$H_{pq}(\mathfrak{X}/\sigma, v/\sigma) = H_p\left(\frac{\mathfrak{X}}{\sigma}\right) H_q\left(\frac{v}{\sigma}\right)$$

Obviously, 2D Hermite Gaussian moments are separable, so the recursive algorithm in 1D cases may be applied for their calculation. Figure XX shows the Fourier transform amplitude of bidimensional HGM kernels of different orders. HGMs are used to efficiently recognize the character plate image.

Image Reconstruction Algorithm

The orthogonality of the basis functions $\hat{H}_p(i)\hat{H}_q(j)$ allows reducing the complexity of computation in the phase of image reconstruction. In fact, the reconstruction can be seen as a summation of basis functions, weighted by the moment values of 0–Nth orders by $$\hat{I}(i,j) = \sum_{p=0}^{N}\sum_{q=0}^{N-p} M_{pq}\hat{H}_p(i)\hat{H}_q(j),$$

where $\hat{I}(i,j)$ is the reconstructed image and the total number of used moment is $$nb_{total} = \frac{(N+1)(N+2)}{2},$$

where N is maximum order of used moments.

Rotation Invariants of Hermite Gaussian moments (Waveletizing Hermites)

From the generalized definition of Hermite polynomials, given by the Rodrigues' formula, $$H_n(\mathfrak{X};a) \triangleq (-1)^n e^{\frac{\mathfrak{X}^2}{a}} \frac{d^n}{d\mathfrak{X}^n} e^{-\mathfrak{X}^2/a}$$

is derived the following recursive formulae for generalized Hermite polynomials, $$H_0(\mathfrak{X};a) = 1$$

$$H_1(\mathfrak{X};a) = \frac{2\mathfrak{X}}{a}$$

$$H_2(\mathfrak{X};a) = \frac{2\mathfrak{X}}{a}H_n(\mathfrak{X};a) - \frac{2n}{a}H_{n-1}(\mathfrak{X};a).$$

where $n \in \mathbb{N}$ is the order of the polynomial, and $a \in \mathbb{R}$ (a ≠0).

The two families of Hermite polynomials commonly found in the literature result if a=1 or a=2 is substituted into the above equation. Generalized Hermite wavelets may be constructed from the generalized definition of Hermite polynomials as follows, $$\psi(\mathfrak{X};a,b) \triangleq \frac{H_n(\mathfrak{X};a)e^{-\frac{\mathfrak{X}^2}{b}}}{\aleph_n(a,b)} \quad (b \in \mathbb{R}; b > 0)$$

where $\aleph_n(a,b)$ are normalization factors which have no known closed form for such wavelets[Ab05] such that explicit formulae for waveforms are not available.

Continuous Two-Dimensional HG

The (p, q) order Hermite moment is defined as $$M_{pq}(x,y,I(x,y)) = \int_{-\infty}^{\infty}\int_{-\infty}^{\infty} I(x+u,y+v) H_{pq}\left(\frac{u}{\sigma},\frac{v}{\sigma}\right) du\, dv$$

where I(x, y) is an image and $H_{pq}$ $$H_{pq}\left(\frac{u}{\sigma},\frac{v}{\sigma}\right) = H_p\left(\frac{u}{\sigma}\right)H_q\left(\frac{v}{\sigma}\right).$$

Orthogonal Hermite Gaussian moments of a signal s(x) defined by $$M_n(x,s(x)) = \int_{-\infty}^{\infty} s(x+\mathfrak{X})B_n(\mathfrak{X})d\mathfrak{X} = \langle B_n(\mathfrak{X}), s(x+\mathfrak{X})\rangle$$

where $$B_n(\mathfrak{X}) = g(\mathfrak{X},\sigma)P_n(\mathfrak{X}) \text{ and } g(x,\sigma) = \left(\frac{1}{\sqrt{2\pi}\,\sigma}\right)\exp\left(-\frac{x^2}{2\sigma^2}\right)$$

and $P_n(\mathfrak{X})$ is a Hermite polynomial function.

The moving objects are detected by integrating the first, third, and fifth moments. The third and fifth moments contain more information than the first moment, so the first, third, and fifth moments can be integrated.

Because the first, third, and fifth moments are orthogonal, one can consider that the first moment is the projection of the image $f(x, y, \mathfrak{X})$ on axis 1; the third moment is the projection of the image $f(x, y, \mathfrak{X})$ on axis 2, the fifth moment is the projection of the image $f(x, y, \mathfrak{X})$ on axis 5; and the axes 1, 3 and 5 are orthogonal. For getting the perfect real moving objects using the first, third, and fifth moments, the vector module of the 3D space may be used to regain its actual measure, namely.

$$M(x,y,\mathfrak{X}) = \sqrt{M_1^2 + M_3^2 + M_5^2}.$$

Note: $M(x, y, \mathfrak{X})$=Orthogonal Hermite Gaussian Moment Images. Notice that the OHGMIs contain more information than a single derivative image or single OHGMs.

The two-dimensional density distribution function, $\rho(x, y)$, in terms of Riemann integrals is :

$$m_{pq} = \int_{-\infty}^{\infty}\int_{-\infty}^{\infty} x^p y^p H(x,y)\, dx\, dy \quad (p,q = 0, 1, 2, \ldots)$$

If $\rho(x, y)$ is piecewise continuous, and therefore bounded, it has nonzero values only in the finite part of the xy-plane, then moments of all orders exist and are unique.

The characteristic function and moment-generating functions are given by $$\phi(u,v) = \int_{-\infty}^{\infty}\int_{-\infty}^{\infty} \exp(iux + ivy)H(x,y)\, dx\, dy$$

$$M(u,v) = \int_{-\infty}^{\infty}\int_{-\infty}^{\infty} \exp(ux + vy)H(x,y)\, dx\, dy.$$

In both cases u and u are assumed to be real. If moments of all orders exist, then both functions can be expanded into power series of the moments, $m_{pq}$, $$\phi(u,v) = \sum_{p=0}^{\infty}\sum_{q=0}^{\infty} m_{pq}\frac{(iu)^v(iv)^q}{p!\,q!}$$

$$M(u,v) = \sum_{p=0}^{\infty}\sum_{q=1}^{\infty} m_{pq}\frac{u^v v^q}{p!\,q!}.$$

Both functions are widely used in statistical theory. If the characteristic function φ(u, v) which is essentially the Fourier transform ρ(x, y), is known, then it may be obtained from the inverse Fourier transform, $$\rho(x, y) = \frac{1}{(2\pi)^2} \int_{-\infty}^{\infty} \int_{-\infty}^{\infty} \exp(-iux - ivy)\phi(u, v) \, du \, dv$$

Close relationships and differences between φ(u, v) and M(u, v) are more evident when both are considered as special cases of the two-side Laplace transform of ρ(x,y), $$\mathcal{L}[\rho(x, y)] = \int_{-\infty}^{\infty} \int_{-\infty}^{\infty} \exp(-sx - \mathfrak{X}y)\rho(x, y) \, dx \, dy$$

where s and $\mathfrak{X}$ are considered as complex variables.

Rotation Invariants of Hermite Gaussian moments in Two Dimensions

Given an image I(x, y) rotated by an arbitrary angle θ, the new Cartesian coordinates after rotation are satisfied with $$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

The non-coefficient Hermite Gaussian moments of the image are $$M_{pq} = \int_{-\infty}^{\infty} \int_{-\infty}^{\infty} I(x, y) H_p\left(\frac{x}{\sigma}\right) H_q\left(\frac{y}{\sigma}\right) \exp\left(-\frac{x^2 + y^2}{2\sigma^2}\right) dx \, dy$$

Then the relationship between $M_{pq}$ and $M'_{pq}$ may be expressed as $$M_{pq} = (\sqrt{2^{p+q} p! q! \pi \sigma})^{-1} M'_{pq}$$

So the rotation independence of the original Hermite Gaussian moments can be calculated from that of non-coefficient Hermite Gaussian moments.

After rotation, Hermite Gaussian moments have the form, with I'(x', y') the rotated image intensity function, $$M'^{\theta}_{pq} = \int_{-\infty}^{\infty} \int_{-\infty}^{\infty} I'(x', y') H_p\left(\frac{x'}{\sigma}\right) H_q\left(\frac{y'}{\sigma}\right) \exp\left(-\frac{x^2 + y^2}{2\sigma^2}\right) dx \, dy.$$

$$= \int_{-\infty}^{\infty} \int_{-\infty}^{\infty} I(x, y) H_p\left(\frac{x'}{\sigma}\right) H_q\left(\frac{y'}{\sigma}\right) \exp\left(-\frac{x^2 + y^2}{2\sigma^2}\right) dx \, dy.$$

The image intensity function remains unchanged during rotation.

Discrete One-Dimensional HG

The moment of p order of a function s(x) at one domain x is defined by $$m_p = \int_x \varphi_p(x) s(x) \, dx$$

In 2D, the moment of p+q order of a signal, s(x, y) at the domain x-y is defined by $$m_{pq} = \int_x \int_y \varphi_{pq}(x, y) s(x, y) \, dx \, dy$$

where $\varphi_{pq}$(x, y) is the basis function of p+q degree.

The basis functions $\varphi_p$(x, y) and $\varphi_q$(x, y) are weight orthogonal in [a, b]×[c, d], $$\int\int_{[a,b]\times[c,d]} w(x, y) \varphi_p(x, y) \varphi_q(x, y) dx dy = C(p, q) \delta_{pq}$$

Where w(x, y) is a weight function, C(p, q) is a constant depending only on p, q and δ(p, q) is the Kronecker delta. (Note: For 1D, $\iint_{[a,b]} w(x) \varphi_p(x) \varphi_q(x) dx = C(p, q) \delta_{pq}$.)

They are orthogonal if and only if $$\int_{x,y} \int \varphi_p(x, y) \varphi_q(x, y) dx dy = \delta_{pq}$$

A Hermite polynomial of p degree over the domain (−∞, ∞) is defined by $$H_p = (-1)^p \exp(x^2) \frac{d^p}{dx^p} \exp(-x^2)$$

It exits the recursive calculation $$H_p(x) = 2x H_{p-1}(x) - 2(p-1) H_{p-2}(x)$$

with initial conditions as shown in Fig.

$$H_0(x) = 1, H_1(x) = 2x.$$

$$H_p(x)$$

is orthogonally, $$\int_{-\infty}^{\infty} H_p(x) H_q(x) \exp(-x^2) dx = 2^p p! \sqrt{\pi} \delta_{pq}$$

where exp(−x²) is the weight function.

The discrete Hermite Gaussian moment of a signal s(x) is defined by $$M_p = \int_{-\infty}^{\infty} s(\mathfrak{X}) \hat{H}_p(\mathfrak{X}/\sigma) d\mathfrak{X}$$

Discrete Two-Dimensional HG

For a digital image function I(i, j) defined over a square [0≤i,j≤K], the image coordinates would first be normalized to be [−1≤x, y≤1] by $$\begin{cases} x = \dfrac{2i - K + 1}{K - 1} \\ y = \dfrac{2j - K + 1}{K - 1} \end{cases}$$

The Hermite Gaussian functions in the discrete case can be written as follows:

$$\begin{cases} \hat{H}_p(i) = \sqrt{\dfrac{2}{K}}\, \hat{H}_p(x/\sigma) \\ \qquad = \dfrac{1}{\sqrt{2^{p-1} p! \sqrt{\pi}\, \sigma K}} \exp\!\left(-\dfrac{x^2}{2\sigma^2}\right) H_p\!\left(\dfrac{x}{\sigma}\right) \\ \hat{H}_q(j) = \sqrt{\dfrac{2}{K}}\, \hat{H}_q(y/\sigma) \\ \qquad = \dfrac{1}{\sqrt{2^{q-1} q! \sqrt{\pi}\, \sigma K}} \exp\!\left(-\dfrac{y^2}{2\sigma^2}\right) H_p\!\left(\dfrac{y}{\sigma}\right) \end{cases}$$

Where $\sqrt{2/K}$ is a scale factor and therefore the digital image Hermite Gaussian moments could be calculated by $$M_{pq} = \sum_{i=0}^{K-1} \sum_{j=0}^{K-1} I(i,j) \hat{H}_p(i) \hat{H}_q(j).$$

To compress an image more efficiently the moment feature vector may be defined by $$M = \begin{bmatrix} M_{0,0}, M_{0,1}, M_{0,2}, \ldots, M_{p,q}, \ldots, \\ M_{N,N} \end{bmatrix}^T$$

where N is the maximum order of moments used.

According to the property of the discrete moments, an image could approximately be found from its Hermite Gaussian moments of 0–Nth orders by $$\hat{I}(i,j) = \sum_{p=0}^{N} \sum_{q=0}^{N} M_{p,q} \hat{H}_p(i) \hat{H}_q(j)$$

The errors estimation of image reconstruction can be estimated by the normalized mean square error (NMSE) according to:

$$NMSE = \frac{\sum_{i=0}^{K-1} \sum_{j=0}^{K-1} [I(i,j) - \hat{I}(x,j)]^2}{\sum_{i=0}^{K-1} \sum_{j=0}^{K-1} [I(i,j)]^2} \times 100\%$$

To define another measurement to characterize the errors of reconstruction $$err = \frac{NE}{TN}$$

where NE represents the number of error classified pixels, and TN represents the total number of pixels in the image.

For orthogonal basis functions, $\psi_{pq}(x, y)$, such as Hermite polynomials, image reconstruction from the orthogonal moments, $M_{pq}$, are computed by $$I(x,y) = \sum_{p=0}^{N} \sum_{q=0}^{N-p} M_{pq} \psi_{pq}(x,y)$$

This reconstruction is "optimal" because it minimizes the mean square error when using only a finite set of moments. On the other hand, image reconstruction from geometric moments cannot be performed directly in the spatial domain. It is carried out in the Fourier domain using the fact that geometric moments from Taylor coefficients on the Fourier transform $$F(u,v) = \sum_{p=0}^{\infty} \sum_{q=0}^{\infty} \frac{(-2\pi i)^{p+q}}{p! q!} u^p v^q m_{pq}$$

Reconstruction of I(x,y) is achieved via inverse Fourier transform and may be performed using Hermite Gaussian moments in two dimensions by $$I(i,j) = \sum_{p=0}^{N} \sum_{q=0}^{N-p} \eta_{pq} \hat{H}_p(i, K; \sigma) \hat{H}_q(j, K; \sigma)$$

The scaling parameter, σ, in the Hermite-Gaussian moment basis functions influences the quality of the reconstruction. Given the same moments for image reconstruction, greater σ results in a smaller reconstructed area but better accuracy.

As a measure of the reconstruction quality, a peak signal-to-noise (PSNR) value is adopted.

$$PSNR = 10 \log_{10} \frac{255^2}{MSE}$$

Where MSE is the mean square error of the reconstructed image with respect to the original $$MSE = \frac{1}{K^2} \sum_{i=0}^{K-1} \sum_{j=0}^{K-1} \left(I(i,j) - \hat{I}(i,j)\right)^2$$

Discrete Rotational Invariants in Two Dimensions

The image intensity function remains unchanged during rotation and may be expressed as a linear combination of Hermite Gaussian moments of the original image, $$M_{pq}^{\theta} = \sum_{r=0}^{p+q} k(r, p, q, \theta) M_{p+q-r, r}$$

Where p and q are non-negative integers, the coefficient k(r, p, q, θ) is determined by $$x'^p y'^p = \sum_{r=0}^{p+q} k(r, p, q, \theta) x^{p+q-r} y^r \quad (0 \le r \le p+q)$$

Orthogonal Moments

In addition to the use of Hermite Gaussian functions to create Hermite Gaussian moments as described herein above, various other types of orthogonal functions may be used to create other types of orthogonal moments that may be used in a similar manner for compressing image and video data. Various examples of these are discussed herein below.

Pseudo-Zernike Moments

Orthogonal techniques include the use of different two-dimensional moments. The two-dimensional pseudo-Zernike moments of order p and repetition q are defined as:

$$A_{pq} = \frac{p+1}{\pi} \int_0^{2\pi} \int_0^1 \overline{W_{pq}(r, \theta)} f(r, \theta) r \, dr \, d\theta$$

where p=0,1,2,3, . . . , ∞ and q is a non-negative integer defined according to the condition q≤p, $$W_{pq}(r, \theta) = \sum_{k=q}^{p} \frac{(-1)^{p-k}(p+k+1)!}{(p-k)!(q+k+1)!(k-q)!} r^k e^{iq\theta}$$

are orthogonal pseudo Zernike polynomials.

Legendre Moments

The two-dimensional Legendre moments of order (p+q) for an image intensity function, f(x, y) are defined by:

$$L_{pq} = \frac{(2p+1)(2q+1)}{4} \int_{-1}^{1} \int_{-1}^{1} P_p(x) P_q(y) f(x, y) \, dx \, dy$$

where the Legendre polynomial of order p is defined in an explicit form $$P_p(x) = \sum_{k=0}^{\lfloor p/2 \rfloor} \frac{(-1)^k (2p-2k)!}{2^p k!(q-k)!(q-2k)!} x^{p-2k}$$

The operator [p/2]=(p−1)/2 if p is odd or p/2 otherwise. The Legendre polynomials, $P_p(x)$, obey the following recurrence relation:

$$P_{p+1}(x) = \frac{(2p+1)}{(p+1)} x P_p(x) - \frac{p}{(p+1)} P_{p-1}(x)$$

with $p_0(x)=1$, $P_1(x)=x$, and p>1.

Krawtchouk Moments

The two dimensional Krawtchouk moments of order (p+q) are defined by[Ho13

$$K_{pq} = \sum_{x=0}^{N-1} \sum_{y=0}^{N-1} \overline{K}_p(x; \alpha, N-1) \overline{K}_q(y; \beta, N-1) f(x, y)$$

where the weighted Krawtchouk polynomials, $\overline{K}_p(x; \alpha, N-1)$, are used instead of the discrete Krawtchouk polynomials, $K_p(x; \alpha, N-1)$ to avoid numerical fluctuations associated with the implementation of the later ones. The weighted Krawtchouk polynomials are defined by:

$$\overline{K}_p(x; \alpha, N) = K_p(x; \alpha, N) \sqrt{\frac{w(x; \alpha, N)}{\rho(p; \alpha, N)}}$$

with the discrete Krawtchouk polynomials expressed as $$K_p(x; \alpha, N) = \sum_{k=0}^{N} D_{k,p} x^k.$$

Quaternionic-Hermite Polynomials

In addition to using moments as described herein above, Quaternionic-Hermite polynomials may be also used for generating moments with respect to particular types of data that are more efficiently transmitted using a Quaternionic structure.

The Hermite transform was introduced in as a signal expansion technique in which a signal is windowed at equidistant positions and is locally described as a weighted sum of polynomials. In this section, a brief overview of the one dimensional classical Hermite transform is given. By a tensorial approach it is generalized to higher dimension in a straightforward manner.

Referring now to FIG. 6, the first step in the Hermite transform is to localize at step 602 the original signal L(x) by multiplying it by a Gaussian window function $$\tilde{V}^\sigma(x) = \frac{1}{\sqrt{\sqrt{\pi}\,\sigma}} \exp\left(\frac{-x^2}{2\sigma^2}\right).$$

A complete description of the signal L(x) requires that the localization process is repeated at a sufficient number of window positions, the spacing between the windows being chosen equidistant. In this way the following expansion of the original signal L(x) is obtained:

$$L(x) = \left(\frac{1}{\tilde{W}^\sigma(x)}\right) \sum_{k=-\infty}^{+\infty} L(x) \tilde{V}^\sigma(x) \tilde{V}^\sigma(x - kT)$$

with $$\tilde{W}^\sigma(x) = \sum_{k=-\infty}^{+\infty} \tilde{V}^\sigma(x - kT).$$

the so-called weight function, which is positive for all x.

The second step consists of decomposing at step 604 the localized signal $L(x)\overline{V}^\sigma(x-kT)$ into a series of orthogonal functions $K_n^\sigma(x) = \overline{V}(x) G_n^\sigma(x)$:

$$\tilde{V}^\sigma(x - kT) L(x) = \sum_{n=0}^{\infty} L_n^\sigma(kT) K_n^\sigma(x - kT),$$

with $G_n^\sigma(x)$ the uniquely determined polynomials which are orthonormal with respect to $(\overline{V}^\sigma(x))^2$.

The coefficients $L_n^\sigma(kT)$ in the above decomposition of the localized signal are called the Hermite coefficients and are given by $$L_n^\sigma(kT) = \int_{-\infty}^{\infty} L(x) G_n^\sigma(x-kT)(\overline{V}^\sigma(x-kT)^2 dx$$

This defining relation of the Hermite coefficients can be rewritten at step 606 as the convolution of the original signal $L(x)$ with the so-called filter functions $D_n^\sigma(x)$, followed by a downsampling by a factor at step 608.

These filter functions $D_n^\sigma(x)$ can be expressed as the derivatives of a Gaussian:

$$D_n^\sigma(x) = \frac{\sigma^n}{\sqrt{2^n n!}} \frac{d^n}{dx^n}\left(\frac{1}{\sigma\sqrt{\pi}} \exp\left(\frac{-x^2}{\sigma^2}\right)\right).$$

Combining the decompositions at step 610, $L(x)$ and $\nabla^\sigma(x-kT)L(x)$, provides the expansion of the complete signal into the pattern functions $Q_n^\sigma$ $$L(x) = \sum_{n=0}^{\infty} \sum_{k=-\infty}^{\infty} L_n^\sigma(kT) Q_n^\sigma(x-kT),$$

with $$Q_n^\sigma(x) = \frac{K_n^\sigma(x)}{\overline{W}^\sigma(x)}$$

The mapping from the original signal $L(x)$ to the Hermite coefficients $L_n^\sigma(kT)$ is called the forward Hermite transform. The signal reconstruction from the Hermite coefficients is called the inverse Hermite transform.

The two-dimensional real-valued Gaussian window function is defined by $$V^\sigma(x) = \exp\left(\frac{-|x|^2}{2\sigma^2}\right) = \exp\left(-\frac{x^2+y^2}{2\sigma^2}\right).$$

Quaternion Arguments of Hermite

Analogous to the Clifford-Hermite polynomials, the $\mathbb{H}$—Hermite polynomials is defined by the relation $$H_n(x) = (-1)^n \exp\left(\frac{|x|^2}{2}\right) \partial^n \exp\left(\frac{-|x|^2}{2}\right),$$

n=0,1,2,3 . . .

A straightforward calculation yields, $H_0(x)=1$ $H_1(x)=x=r\omega$ $H_2(x)=x^2+3=-r^2+3$ $H_3(x)=x^3+5x=(-r^3+5r)\omega$ $H_4(x)=x^4+10x^2+15=r^4-10r^2+15$ where spherical coordinates are introduced $x=r\omega$; $r=|x|$; $\omega=\sin\theta\cos\phi e_1 + \sin\theta\sin\phi e_2 + \cos\theta e_{12} \in S^2$, $\theta \in [0, \pi]$, $\phi \in [0,2\pi]$ where $S^2$ denotes the unit sphere in $\mathbb{R}^3$.

Quaternion Compression

A quaternion x, as a form of hyper-complex is made of one real and three imaginary parts, defined as[Li10]

$x=x^{(e)}+x^{(i)}i+x^{(j)}j+x^{(k)}k$ where $x^{(e)}, x^{(i)}, x^{(j)}, x^{(k)} \in R$ and 1, i,j,k are defined as the bases of quaternions, adopting the Hamilton rules, $i^2=j^2=k^2=-1$, $ijk=1$ $ij=-ji$, $jk=-kj$, $ki=-ik=j$ From these rules the product of quaternions are associative but not commutative.

The conjugate of quaternion x, denoted by $\bar{x}$.

$\bar{x}=x^{(e)}-x^{(i)}i-x^{(j)}j-x^{(k)}k$

The norm is defined by $n(x)=\sqrt{x\bar{x}}=\sqrt{\bar{x}x}=\sqrt{x^{(e)2}+x^{(j)2}+x^{(k)2}}$ The pure imaginary quaternion, a quaternion with a zero component, may be expressed by $x=x^{(i)}i+x^{(j)}j+x^{(k)}k$ Quaternion matrix theory and its operation properties are shown in a number of ways. As may be shown, any quaternion matrix exist singular value decomposition (SVD) has been proven.

Let $A \in Q^{n \times n}$, rank(A)=m, there exist two general unityary quaternion matrices U and V as $$U^H A V = \begin{pmatrix} \Lambda_r & 0 \\ 0 & 0 \end{pmatrix}$$

Where $U^H$ denotes the Hermitian transpose operator or conjugate-transposition operation $\Lambda_r$=diag$\{\lambda_1, \ldots, \lambda_m\}$ with $1 \leq m \leq n$ and $\lambda$ real singular values of A, the two unitary matrices U and V satisfy $UU^H=VV^H=I_r$. A can be rewritten as:

$$A = U\begin{pmatrix} \Lambda_r & 0 \\ 0 & 0 \end{pmatrix} V^H$$

Some properties' application to QSVD are very important to color image, Le Bihan and Sangwine have done summery as follows:

Invariance to spatial rotation (also true in the case of grayscale images with SVD)

Invariance to spatial shift (vectors in U and V are shifted by the same amount)

Invariance to color space rotation These properties provide us an important foundation to the color image analysis.

For an image to be compressed it may be represented as an pure imaginary quaternion matrix $A \in Q^{n \times n}$, then each pixel in the image can be denoted as a pure imaginary quaternion, so QSVD can be employed to decompose the image, $A = U\Lambda V^H$ where the formula is similar to the real-value SVD, it indicates a color image can be decomposed into summation of vectors outer product, $$\hat{A} = U\Lambda V^H = \sum_{i=1}^{R} \lambda_i (u_i \times v_i^H)$$

where $u_i$ and $v_i$ are column vectors of matrix U and V, respectively. $u_i \times v_i^H$ are defined as an eigen-image, $\lambda_i$ is real singular value in the diagonal matrix $\Lambda$. R is the rank of the A, therefore a color image's full information can be depicted as the composition of R color eigen-images. After QSVD, the first K PCs is chosen to depict the original image, that is the product of first K eigen-images and their weights, the reconstructed image can be derived from the summation as:

$$\hat{A} = \sum_{i=1}^{K} \lambda_i (u_i \times v_i^H)$$

It can be easily found that the composition ratio is up to the value of K.

For lossless spectral color image compression using a quaternion Hermite transform (HFTs), a mathematical procedure may be developed by analogy to a quaternion Fourier transform approach (QFT). The QFT of a 2D real signal s(x, y) may be defined by $$F_q(u,v) = \int_{-\infty}^{\infty} e^{-2\pi i u x} s(x,y) e^{-2\pi j v y} dx\, dy$$

This QFT, of type 1, is noted two-side. If the input signal s(x, y) is a quaternion function and not only a real function, it may be decomposed, $$s(x,y) = s_r(x,y) + s_i(x,y) \cdot i + s_y(x,y) \cdot j + f_k(x,y) \cdot k$$

where $s_r(x, y)$, $s_x(x, y)$, $s_y(x, y)$, and $s_k(x, y)$ are real functions. Then, $$F_q(u,v) = F_{rq}(u,v) + F_{iq}(u,v) i + F_{jq}(u,v) j + F_{kq}(u,v) k.$$

This possibility is used, in particular, in the case where s(x, y) is an RGB color image, multimodalities images, or multi-components, of the same modality, but with different adjustments of parameters.

Figure 7:
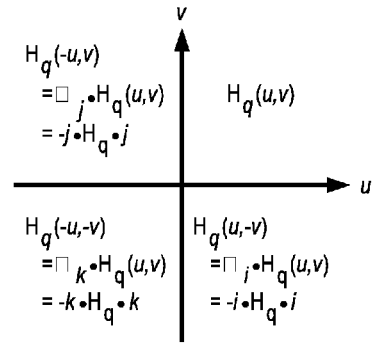
FIG. 7 illustrates the Hermitian properties of a quaternion Hermite transform function in four quadrants.
Figure 8:
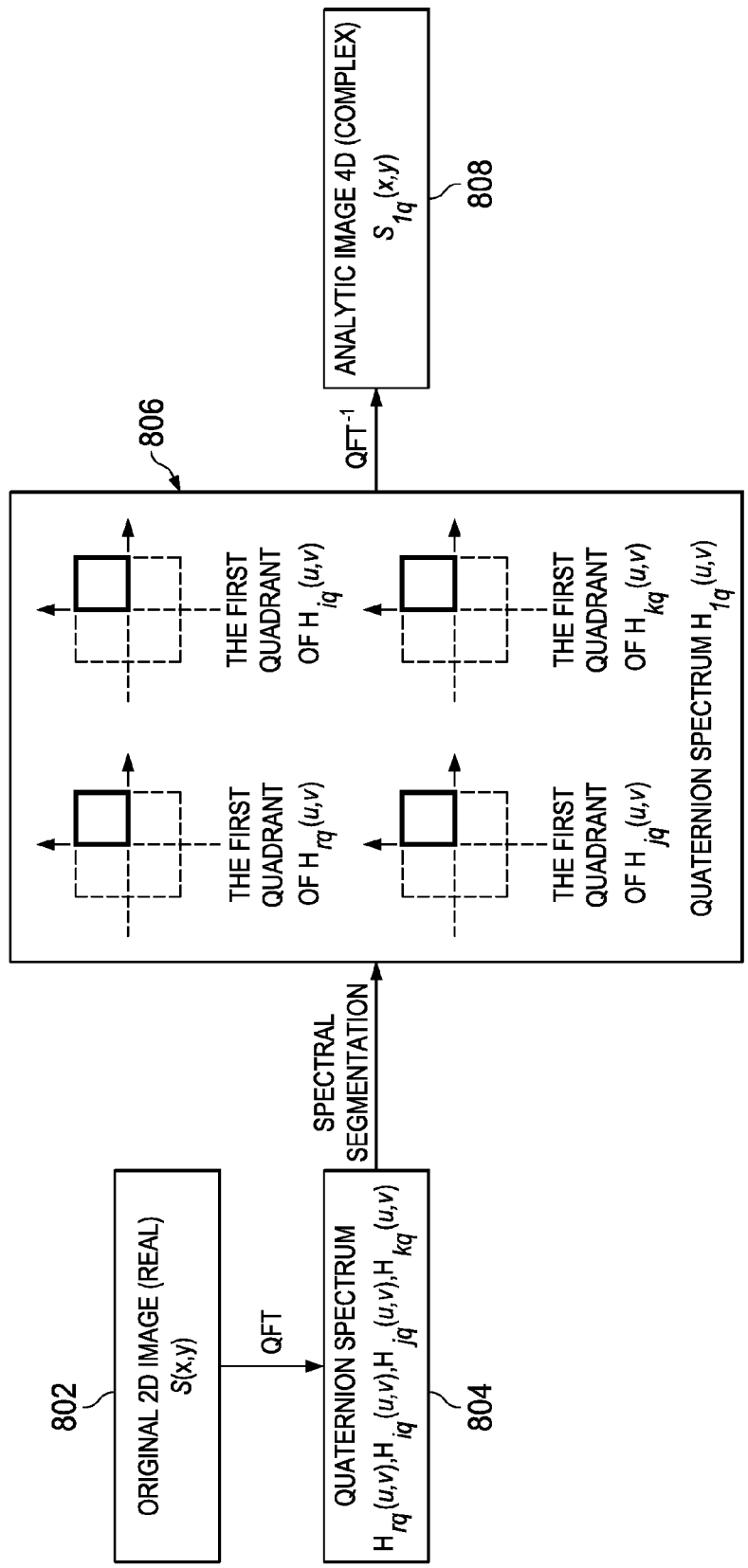
FIG. 8 illustrates the use of a quaternion Hermite transform.

Referring now to FIG. 7, there are illustrated the Hermitian properties of a quaternion Hermite transform (QHT) function in each of four quadrants. FIG. 8 illustrates the use of a quaternion Hermite transform. The original 2-D image has a quaternion Fourier transform applied thereto at step 802 to provide a quaternion spectrum function at step 804. The quaternion spectrum function has spectral segmentation at 806 applied to the quaternion spectrum for each of the four quadrants. An inverse quaternion Fourier transform is performed at step 808 to generate an analytic 4D image.

Figure 9:
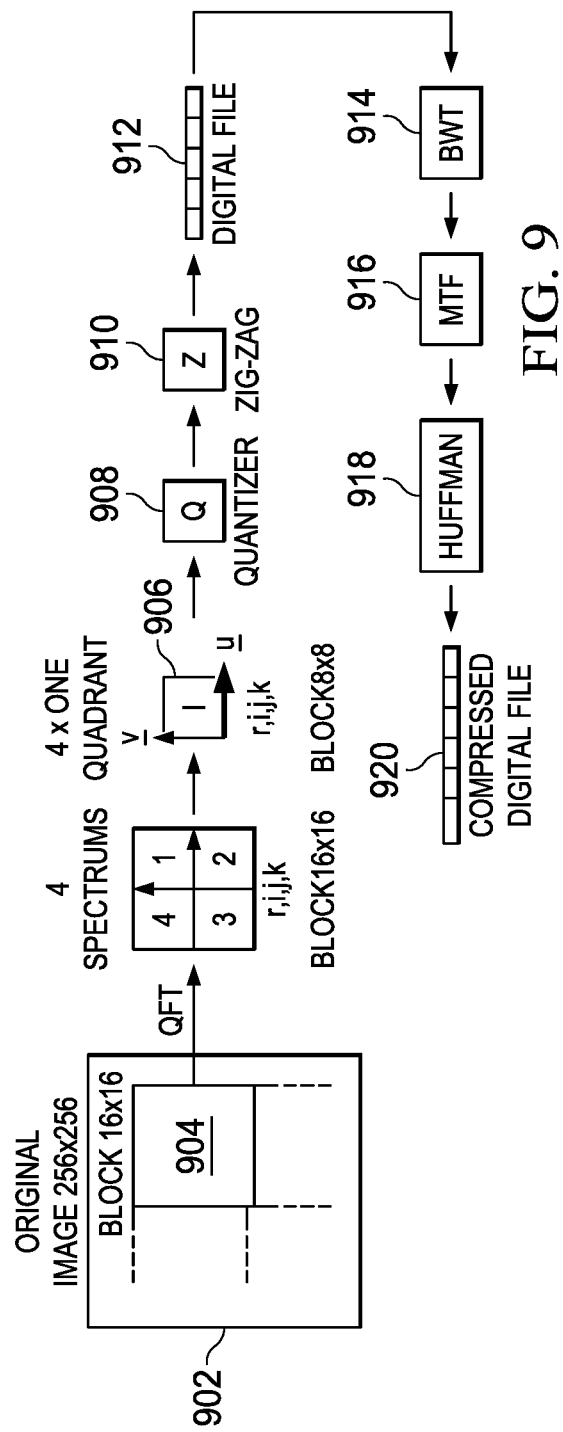
FIG. 9 illustrates a functional schema using quaternion Hermite transforms.

FIG. 9 illustrates the functional schema using quaternion Hermite transform (QHT). An original image 902 consist of a 256×256 image. A 16×16 block 904 has a QFT applied thereto to convert the four spectrums of the 16×16 block into four single qudrant blocks 906. The data is then applied to a quantizer 908 in zigzag 910 to generate a digital data file 912. The digital data file zip compressed by applying a BWT(Burrows-Wheeler-Transform) 914 and a MTF (Move-to-Front) Transform 916. A Huffman coding algorithm 916 then processes the data to create a compressed digital file 920. These may be performed sequentially, as shown, or in parallel.

RGB & YCrCb/Artifacts

Human perception of gray level images is quite satisfactory, but color images do seem to be perceptually richer. Different from gray level, color data representations are usually ternary. For example, color image data from a frame grabber are usually in the RGB (red, green, blue) primary color space. Another colorimetric representation which allows for a description of the entire visual is the $YC_rC_b$ color coordinate space. To effectively compute multidimensional color data, an efficient expression of color data is necessary. The use of vector fields as the theoretical model of color data has been proposed. The algorithm for color edge detection may be obtained through the use of differential geometry and vector analysis. Alternatively, an algebraic approach to the generalization of the moment-preserving principle of monochrome BTC to multidimensional color images may be used.

Figure 10:
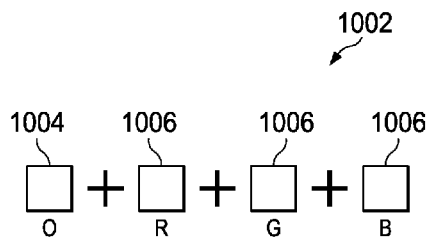
FIG. 10 illustrates the use of a quaternion function for transmitting RGB color data.

Although real and complex number systems are used to provide arithmetic operations of one-dimensional and two-dimensional data, there are no usual laws of arithmetic to handle algebraic operations of ternary numbers. Referring not to FIG. 10, a quaternion number 1002 may be chosen as the expression of color data. One dimension 1004 of the quaternion number 1002 is redundant and may be set to zero. The remaining dimensions 1006 may be used to represent the red green and blue values. Quaternion arithmetic is the generalization of complex numbers. Using quaternion arithmetic, analytical formulas for monochrome BTC can still be maintained for a color image. Routine BTC is a special case of the proposed moment-preserving BTC in the quaternion space. Some preliminaries of quaternion arithmetic and the definition of quaternion moments are given below.

Considering a 4D real-valued data set $H=\{(q_0(n), q_1(n), q_2(n), q_3(n))\}_{n=1}^{N}$, a quadruple data point $(q_0(n), q_1(n), q_2(n), q_3(n))$ may be expressed as a quaternion number $$\hat{q}(n) = q_0(n) + q_1(n) \cdot i + q_2(n) \cdot j + q_3(n) \cdot k$$

Where i, j and k denote the operation unites of quaternion number. Any vector $v \in R^3$ can be expressed as a quaternion with $q_0$ set to zero. For example, an(R, G, B) color value may be shown as a quaternion with $q_1=R$, $q_2=G$, $q_3=B$, and $q_0=0$ as shown in FIG. 10. Any vector $v \in R^2$ may be expressed like a complex number. A quaternion may also be denoted as $\hat{q}(n)=(a, b)$ where $a=(q_1(n), q_2(n), q_3(n))$ and $b=q_0(n)$.

Operations on quaternion numbers have the following properties. Addition and subtraction rules of quaternions are the same as for complex numbers. Using the cross product of vector space (×), one can define multiplication of two quaternions, $\hat{q}$ and $\hat{q}'$ as $$\hat{q} \cdot \hat{q}' = \langle a, b \rangle \cdot \langle a', b' \rangle$$
$$= \langle a \times a' + b \cdot a' + b' \cdot a, b \cdot b' - a \cdot a' \rangle$$

The conjugate of $\hat{q}$ is given by $$\hat{q}^* = -\langle a, b \rangle = q_0 - (q_1 \cdot i + q_2 \cdot j + q_3 \cdot k)$$

And the norm of the quaternion is denoted as $\|\hat{q}\|^2 = \hat{q} \cdot \hat{q}^*$. The reciprocal of $\hat{q}$ is:

$$(\hat{q})^{-1} = \frac{\hat{q}^*}{\|\hat{q}\|^2}$$

With the help of the reciprocal, the division of quaternions is denoted by $$\frac{\hat{q}'}{\hat{q}} = \hat{q}' \cdot (\hat{q})^{-1}$$

Based on this definition of a quaternion, the first, second and third-order quaternion moments may be designated as follows in order to explicitly express the statistical parameters of a 4D data point.

$$\hat{m}_1 = E[\hat{q}]$$

$$\hat{m}_2 = E[\hat{q} \cdot \hat{q}^*]$$

$$\hat{m}_3 = E[\hat{q} \cdot \hat{q}^* \cdot \hat{q}]$$

Where $E[\cdot]$ represents the expectation. The definitions of $\hat{m}_1$ and $\hat{m}_2$ are the extension of complex moments. The definition of the third-order quaternion moment $\hat{m}_3$ is adopted from high-order statistics. These expressions may be further expressed as:

$$\hat{m}_1 = E[q_0] + E[q_1] \cdot i + E[q_2] \cdot j + E[q_3] \cdot k$$
$$\hat{m}_2 = E[q_0^2 + q_1^2 + q_2^2 + q_3^2]$$
$$\hat{m}_3 = E[q_0^3 + q_1^2 q_0 + q_2^2 q_0 + q_3^2 q_0] + E[q_1^3 + q_1^2 q_1 + q_2^2 q_1 + q_3^2 q_1] \cdot i + E[q_2^3 + q_1^2 q_2 + q_2^2 q_2 + q_3^2 q_2] \cdot j + E[q_3^3 + q_1^2 q_3 + q_2^2 q_3 + q_3^2 q_3] \cdot k$$

Video is a series of two dimensional images played in rapid succession. Each image is represented by a matrix of individual small colored dots. Looking at a typical high definition movie, the playback is typically 24 frames per second at 1080p. A 1080p image, by definition, is 1920 pixels wide by 1080 pixels tall. One other element for video display is color depth. A Blue Ray DVD player will play in 24 bit color (which allows for up to 256 shades for each Red, Green, and Blue colors per pixel). What does all this mean? The math is pretty simple: 1920×1080×24=49.77 Mbit of data in total for one frame of a movie. Multiplying this out for a 2 hour HD movie and suddenly you need almost 1200 Mbps which equates to about 1 Terabyte of information displayed during the entire movie. Keep in mind there is continued pressure to display more frames per second and more color depth, forcing the need for higher bandwidth.

Figure 11:
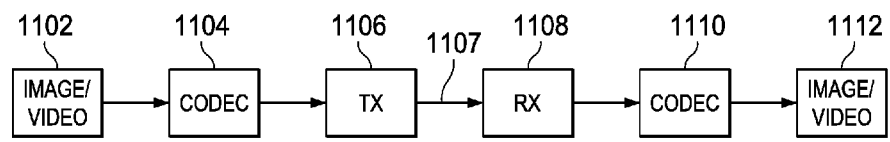
FIG. 11 is a functional block diagram of the components for transmitting compressed image/video data.

This is a much bigger dilemma than exists with audio. With speech/audio comprises a continuous sound event that is really nothing more than air pressure changes over time. This audio signal can easily be transferred into an analogue electrical signal. A typical CD plays 2 channel audio at a rate of 1.4 Mbps, which equates to approximately 1.2 GB for that same 2 hour movie. Fortunately, the human eyes and ears are not so perfect and through the use of various techniques, digital audio and video can be compressed for better bandwidth utilization during playback. With compression comes loss of data, and fortunately the human eyes are much less sensitive to this loss of data than the ears. The challenge then becomes developing encoders and complimenting decoders (hence the term codec) to stuff as much information into as few bits and bytes possible. This process is generally illustrated in FIG. 11 where in an image or video 1102 are provided to a codec 1104 for compression to a smaller size for transmission. In one embodiment the moment compression technique using orthogonal functions described herein above may be utilized. The compressed data is transmitted from a transmitter 1106 over a link 1107 to a receiver 1108. The link 1107 may comprise a wireless or wireline link depending upon the application. The receiver 1108 provides the compressed image/video to a codec 1110 that it decodes the compressed data and provides a reconfigured image/video 1112. In this manner by transmitting only a portion of the image/video data 1102 over the link 1107 the image/video may be reconfigured at a remote location.

One area to target for reduction of video file size is color. As mentioned above, the representation of an image as matrix of colored dots requires a huge amount of data. Usually, the color information of a pixel is described in Red, Green and Blue (RGB) in a so-called absolute color space. The actual color space itself depends of the definition of the individual color range. There are only 8 color bits per channel used in RGB24, a very widely used approach for color video. Each dot or pixel requires 24 bits (8 bits each for Red, Green, and Blue) however, there are professional image formats supporting even 14 bits per channel that would lead to more than 40 bits per pixel. Over time, the pressure for higher quality video will continue, with richer colors leading to higher bandwidth needs in order to transport the video digitally. When watching a video, the human eye is much more sensitive to brightness than it is to color. Therefore, bandwidth can be optimized by devoting more bits to the 'luma' component than to color components. To accomplish this, the first step is to convert the absolute color space RGB information into a format that can separate the luma (brightness) and chroma (color). The resulting video becomes encoded into the $YC_bC_r$ format, which is no longer an absolute color space. For $YC_bC_r$, the Luminance (Y) value and two differential Chrominance ($C_bC_r$) values are derived from the RGB absolute color space.

Figure 12:
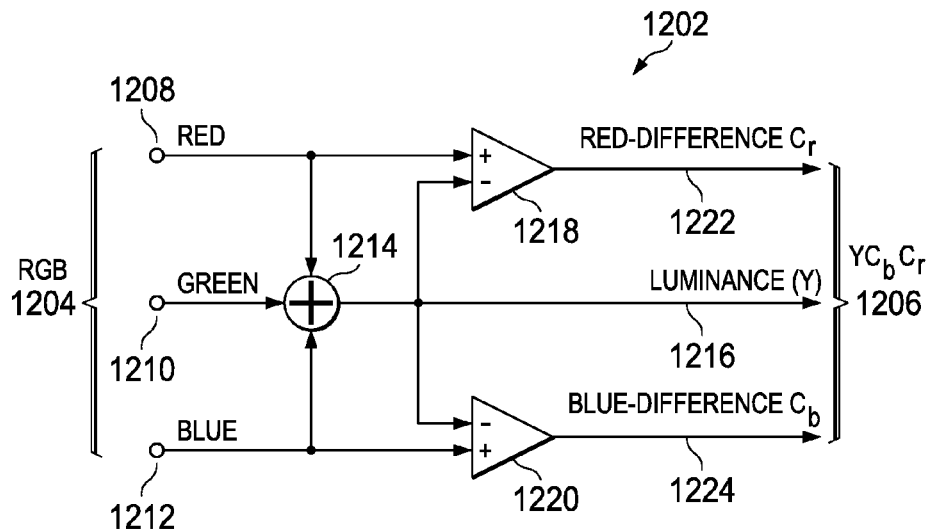
FIG. 12 illustrates a conversion circuit for converting RGB signals into $YC_bC_r$ signals.

Referring now to FIG. 12, there is illustrated a conversion circuit 1202 for converting an RGB signal 1204 into a $YC_bC_r$ signal 1206. Within the converter 1202, the red signal is applied to input 1208, the green signal is applied to input 1210 and the blue input is applied to input 1212. Each of the red green and blue signals are added in an adder circuit 1214 to generate the luminance signal (Y) 1216. The luminance signal 1216 is applied to the negative inputs of differential circuits 1218 and 1220. The positive input of differential circuit 1218 receives the red signal 1208. Differential circuit 1218 provides as its output the red difference $C_r$ 1222. Similarly, the blue signal 1212 is applied to the positive input of the differential circuit 1220. The output of the differential circuit 1220 provides the blue difference $C_b$ 1224.

The Y channel 1216 transports most of the information. The Y channel 1216 can be imagined as a grey scale conversion of the RGB image. The two chrominance channels $C_r$ 1222 and $C_b$ 1224 carry less information compared to Y 1216. However, the complete RGB matrix 1204 can be reproduced by the full $YC_bC_r$ information 1206.

The full $YC_bC_r$ format is called $Y C_bC_r$ 4:4:4. This is the full counterpart to RGB. In this case each pixel is described by the luminance and the chrominance information and a lossless conversion between the planes is possible. The 4:4:4 represents for every 4 pixels of luminance (Y) 4 pixels of blue difference chrominance ($C_b$) and 4 pixels of red-difference chrominance ($C_r$) are also included in the data transmission.

In consumer and even in higher quality video coding or storing methods, the chrominance information can be reduced since the human eye is less sensitive to color information than to brightness. In fact, less chrominance information can be included without visible impairments. This means that each pixel can get a luminance value, but you can actually drop some pixels of chrominance values and a typical viewer would not see a difference in video quality. The chrominance value is 'bundled' for a small area of pixels. This so-called 'chroma sub-sampling' simply omits the $C_bC_r$ information for a percentage of pixels while the Y (luminance) information is always included.

Figure 13:
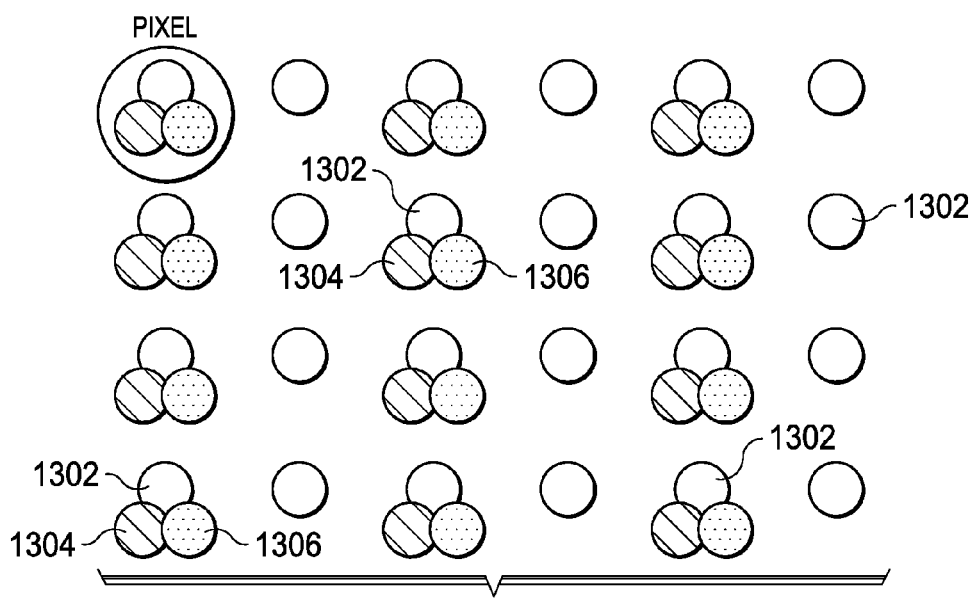
FIG. 13 illustrates a 4:2:2 format of a $YC_bC_r$ signal.
Figure 14:
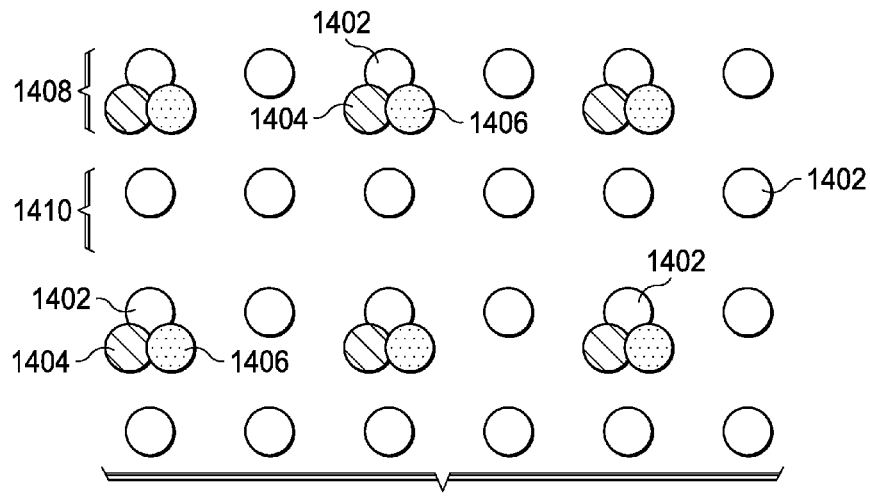
FIG. 14 illustrates a 4:2:0 format of a $YC_bC_r$ signal.

There are two forms of chroma sub-sampling used in digital videos today. FIG. 96 illustrates the first technique used and is called $YC_bC_r$ 4:2:2 format. The second is called $YC_bC_r$ 4:2:0 and is illustrated in FIG. 95. For the 4:2:2 version (FIG. 13), for every 4 pixels, the Y value 1302 is included in all, whilst the $C_bC_r$ values 1304, 1306 are included in half. For the 4:2:0 version (FIG. 14), the Y value 1402 is included in all pixels, and the $C_b$ $C_r$ values 1404, 1406 are included in every 2nd pixel of the first line 1408 of the video but they are excluded from every pixel in the 2nd line 1410 of the video. Essentially every other line of the video is completely missing the $C_bC_r$ values 1404, 1406.

Even studio standards use this technique called $YC_bC_r$ in 4:2:2 formats, and indication that from a human perspective dropping half the chrominance information is generally not perceivable by the human eye. Digital video and other consumer devices even use $YC_bC_r$ in 4:2:0 formats, which reduce the color information by a substantial 75%.

Video is a series of images played back in rapid succession. Significant reduction in data is possible, for instance, if a video has a sequence of a few seconds where there is hardly any motion. It is possible to just repeat data already transmitted in this event.

Figure 15:
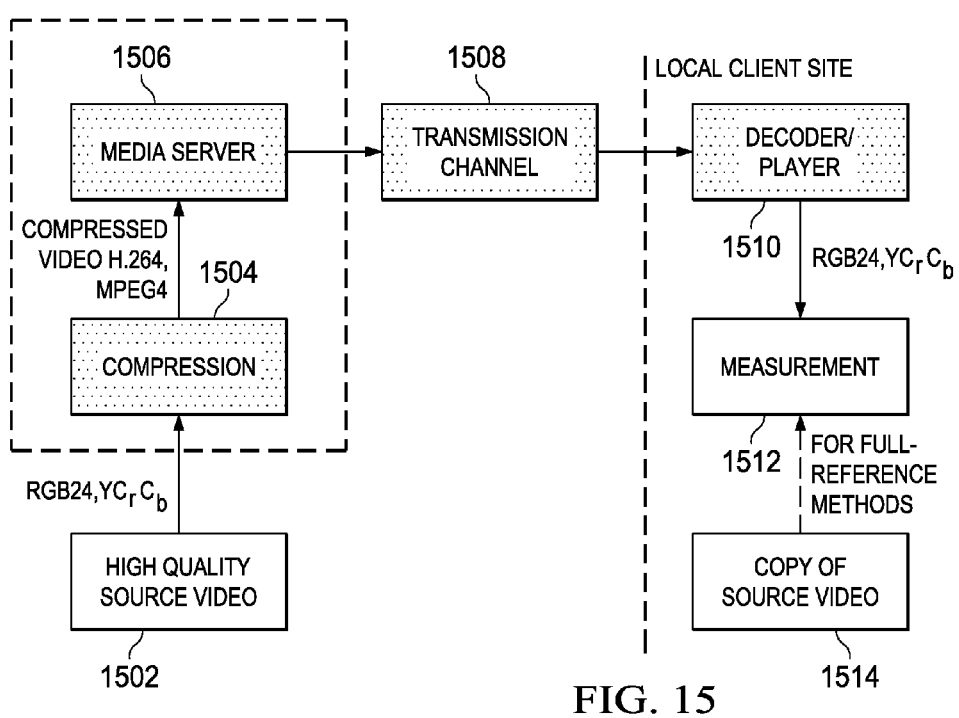
FIG. 15 illustrates a video flow in a streaming system for providing quality measurements.
Figure 16:
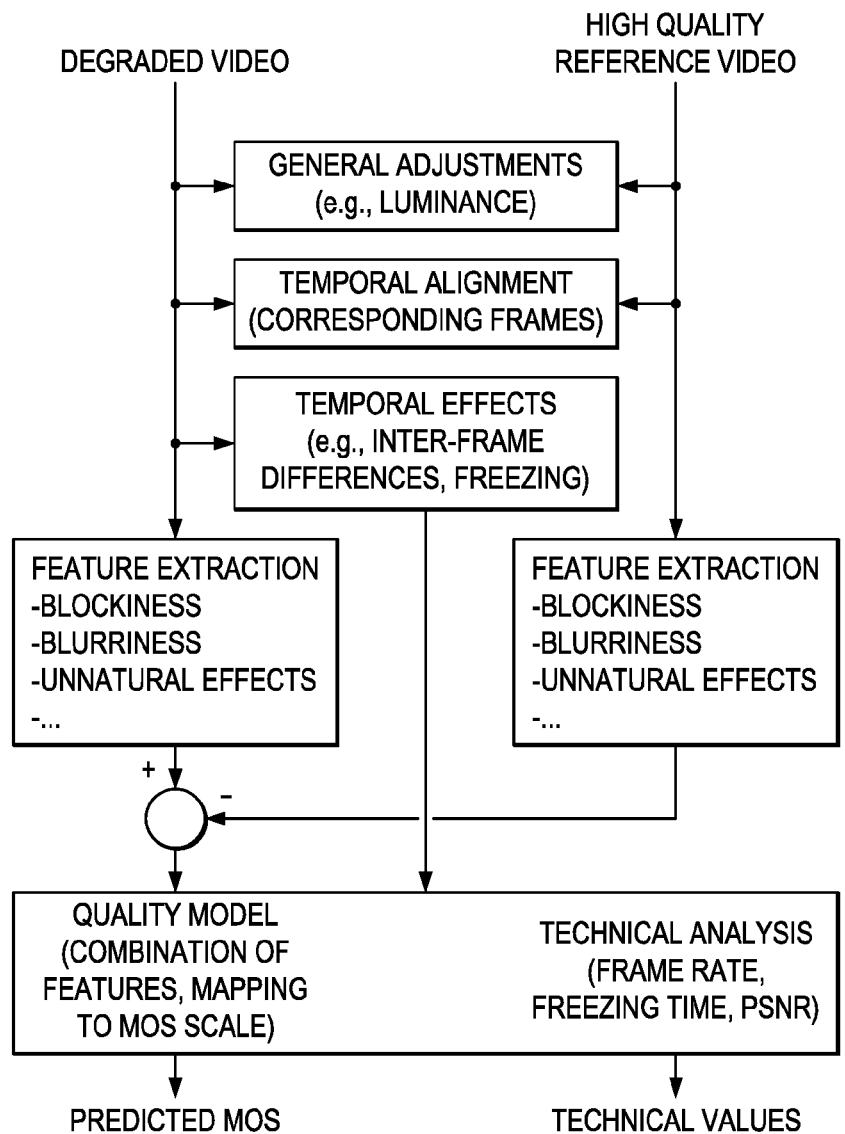
FIG. 16 illustrates the principle of VQuad for signal quality measurements.

Referring now to FIG. 15 there is illustrated the video flow in a streaming system for providing quality measurements. A high quality video source 1502 that uses either RGB 24 or $YC_rC_b$ is provided to a compression algorithms 1504 and the compress video is provided onto a media server 1506. The media server 1506 transmits the data over a transmission channel 1508 to a decoder/player 1510. Decoded signals are then provided for quality measurements 1512. Comparisons may be made to the source data by comparing the measurements to a copy of the source video 1514. FIG. 16 illustrates the principle of VQuad as an example of a full reference method for performing the signal quality measurements.

Figure 17:
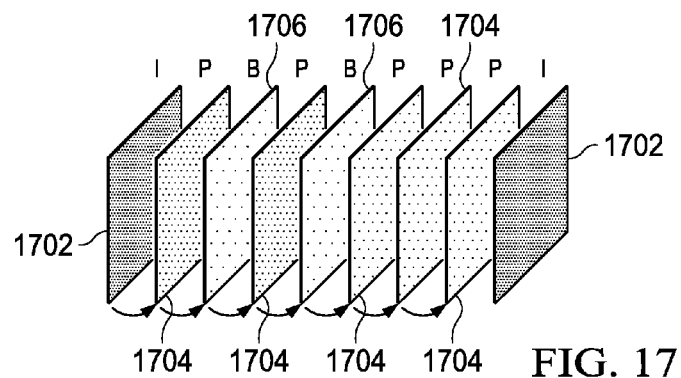
FIG. 17 illustrates a series of compressed video frames.

Referring now to FIG. 17, if all information from a frame of video is available, the entire image can be drawn—of course with coding artifacts. Images or frames drawn from a complete set of data are called I-frames or key-frames 1702. Although the compression is efficient, the required amount of data for a high quality image remains quite high. The next image in sequence can be significantly reduced in size by only transmitting the data that has changed from the prior image. Therefore, with video compression algorithms, only differential information is transmitted that refers to a complete image, an I-frame. Such differential information to the previous image is referred to as a P-frame 1704. In principle, P-frames 1704 only update information for each macro-block using two methods:

1) differences in luminance and chrominance,
2) movement of a macro-block if necessary.

This way, each macro-block can be adapted in luminance and color to changes in the next image and can be moved (or re-drawn at another place) as well. There are cases, where a difference indication becomes insufficient for describing the changes; in those cases a complete macro-block information as in an I-frame can be transmitted within a P-frame as well. That applies even to entire groups of macro-blocks. That is often called a 'partial update'.

There are other frame types, especially for more recent coding schemes such as B-frames 1706, which use backward and forward differential information.

Differential coding becomes critical when errors occur and information is falsely interpreted. If an error occurs during transmission, that error will be propagated since the error does not become corrected by the subsequent image or frame. For that reason, in regular distances key-frames 1702 are inserted for synchronizing the information by providing a complete image. Usually, one key-frame 1702 per second is transmitted. There are other strategies as well, for example forced partial updates of Groups of Blocks (GOB) in P-frames 1704 in between key-frames 1702. Information from one key-frame 1702 to the next are often organized and called a group of pictures (GOP).

However, the different frame types require a different amount of data for storing the image information. Basically, an I- or key-frame 1702 requires many more bits than a (differential) P-frame 1704 or B-frame 1706. In case the compression is locally constant, a full image description requires of course more bits. Secondly, spatial complexity has a significant effect on bitrate. A spatially less complex image requires less data, and even less after compression. Conversely, a spatially complex image requires more bits to describe. As a result, the bitrate varies over time depending on the complexity of the images within a segment of the video. Increased spatial complexity has visible peaks where I-frames 1702 are transmitted. However, due to constant quantization coefficients in the algorithm, the quality can be considered as constant over time.

Several artifacts caused by video coding and transmission include blockiness, tiling, blurring, mosquito noise, color bleeding, slicing, shadowing, and jerkiness.

Containers

Several video containers exist for containing the video frames including the following: 3GP, 3G2, ASF, AVI, DivX, EVO, F4V, FLV, MKV, MCF, MP4, MPEG, OGG, MOV, QT, RMVB, VOB+IFO, WebM.

Application Within Encoders/Decors

Figure 18:
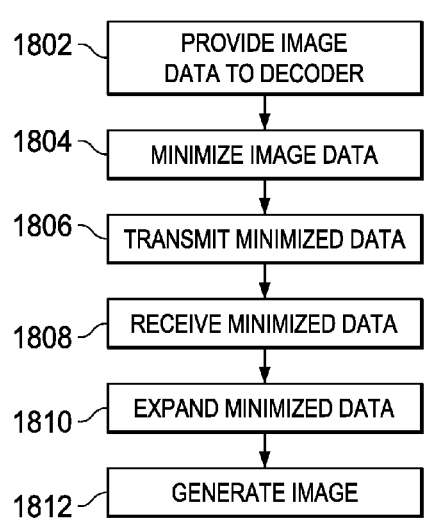
FIG. 18 is a flow diagram illustrating a process for minimizing data for transmission.

The various discussions hereinabove may implement the described methods within encoders/decoders that are used for generating and reconstructing compressed image/video data that is being transmitted over a wireless or wireline connection. The encoders/decoders would implement a number of functionalities that enable the data compressed using moments as described above to be transmitted. Referring now to FIG. 18, there is described the generalized process for minimizing data for transmission. The image data is provided at step 1802 to an encoder for processing. Using one of the above described techniques, the image data is minimized at step 1804 in order to conserve bandwidth over a transmission channel. The minimize data is transmitted at step 1806 over the communications link and received by a decoder at step 1808. The received minimize data is expanded at step 1810, and the expanded data is used to re-create the image at step 1812. The image may comprise still or video images in one embodiment or may be utilized to transmit various other types of compressed information as described herein.

Figure 19:
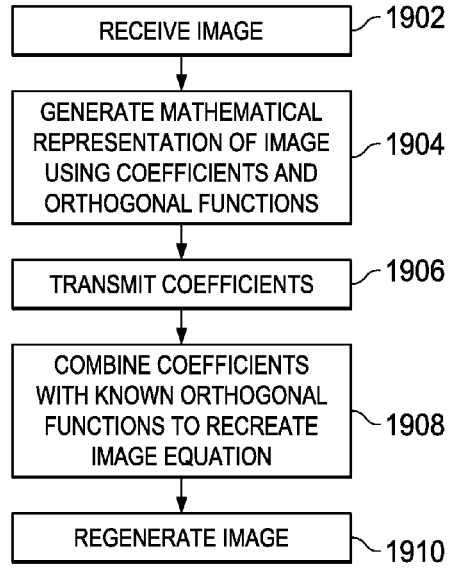
FIG. 19 is a flow diagram illustrating the process for minimizing compressed data for transmission over a communications link using orthogonal functions.

Referring now to FIG. 19, there is more particularly illustrated the manner in which orthogonal functions may be used for minimizing compressed data for transmission over a communications link. An image is received at step 1902, and a mathematical representation of the image is generated at step 1904 by an encoder using coefficients and orthogonal functions, for example a Hermite-Gaussian function. The orthogonal function that is utilized for the generation of the mathematical representation of the image data is known at both the encoder at the transmitting end and decoder at the receiving end. The coefficients of the mathematical representation are transmitted at step 1906 from a transmitter to a receiver. The received coefficients are combined at step 1908 at the encoder with the known orthogonal functions in order to re-create the mathematical representation of the image at the decoder. The used orthogonal functions are the same as those used at the encoding process of step 1904. The regenerated image equation may then be used to re-create the image at step 1910.

Figure 20:
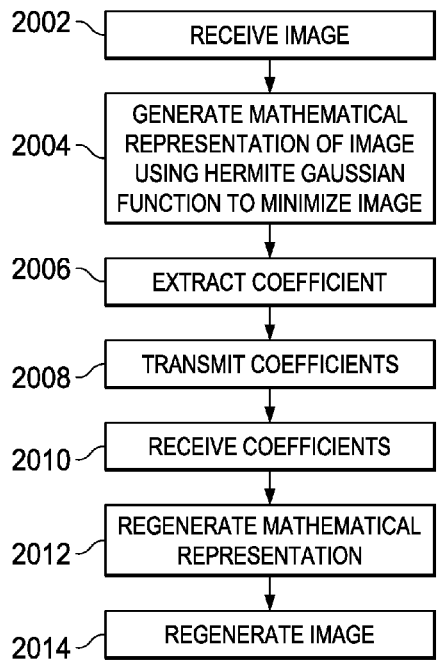
FIG. 20 is a flow diagram illustrating the use of a Hermite Gaussian function for minimizing space-spatial frequency.

A more particular illustration of the process described with respect to FIG. 19 is illustrated in FIG. 20. An image is received at step 2002 at an encoder and a mathematical representation of the image is generated at step 2004 using a Hermite Gaussian function to generate image data that minimizes space-spatial frequency. This provides a minimization of the image data. The coefficients of the minimized image data are extracted at step 2006 and transmitted at step 2008 to a decoder. The coefficients are received at step 2010 and the mathematical representation of the minimized image equation is regenerated at step 2012. The equation is regenerated utilizing the coefficients that were received and the known Hermite Gaussian function used in originally producing the equation at the encoder. The equation is used to regenerate the image at step 2014.

Figure 21:
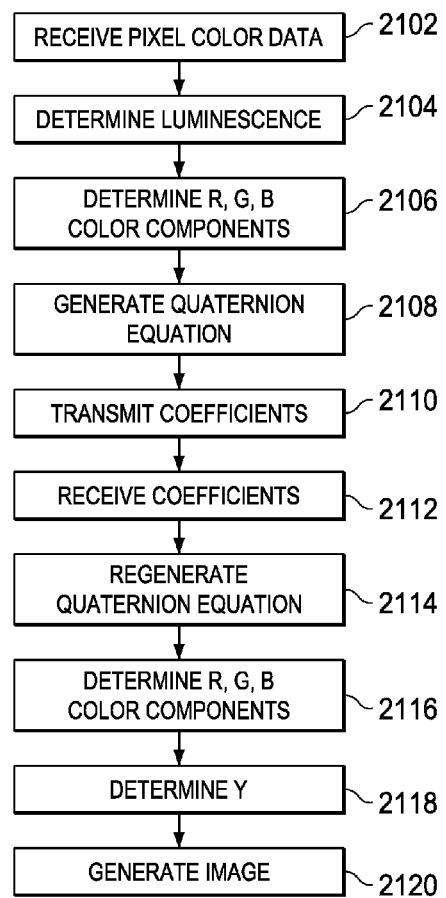
FIG. 21 is a flow diagram illustrating the manner for generating a moment equations for a quaternion equation using RGB pixel data.

FIG. 21 more particularly illustrates the manner in which the data is used for generating the moment equations comprises RGB pixel data that is used within a Quaternion equation. The pixel color data is received at step 2102 by an encoder. The luminescence value Y is determined from the pixel data at step 2104. The RGB color components may be determined at step 2106 in a number of ways. In a first embodiment, a RGB components could be converted into chroma as described herein above. Additionally, the RGB components could be transmitted as received along with the luminescence data. The luminescence and color components are used to generate a quaternion equation at step 2108, and the coefficients of this quaternion equation are then transmitted to a receiving encoder at step 2110. The coefficients are received at a decoder at step 2112, and the quaternion equation is regenerated at step 2114 from the received coefficients and the known quaternion functions used in generating the original quaternion equation at the decoder. The RGB color components are determined from the equation at step 2116 along with the luminescence value Y at step 2118. The color and luminescence values may then be used to generate the image at step 2120.

Any of the mathematical operations described with respect to moments may be used by an encoder/decoder pair for transmitting compressed information between a transmitting point and a receiving point. Compression of the data using these techniques enable more efficient use of bandwidth in the transmission/communication systems.

QRS 1-Dimensional (Time)

An application for 1D Hermite compression is QRS heartbeat monitoring in the time-domain. The compression of ECG signals, in particular QRS complexes, is based on the expansion of signals, s(t) with compact support into the basis of discrete Hermite functions. These functions can be constructed by sampling continuous Hermite functions at specific sampling points and forming an orthogonal basis in the underlying signal space. The algorithm relies on the theory of signal models based on orthogonal polynomials. The constructed discrete Hermite functions have important advantages compared to continuous Hermite functions. The algorithm achieves higher compression ratios compared with previously reported algorithms based on continuous Hermite function, discrete Fourier, cosine, or wavelet transforms.

Some classes of electrophysiological signals have (or can be assumed to have) compact support. These signals represent the impulse responses of a system or an organ to an electrical stimulation that is recorded on the body surface. Examples include electrocardiographic (ECG), electroencephalographic, and myoelectric signals.

The major role of electrophysiological signals is to provide information about a patient's condition, and reflect important changes in his/her state. In addition, it may also be desired to store electrophysiological signals for later analysis and reference. However, the visual analysis and monitoring of long-term repetitive signals is a tedious task that requires the presence of a human operator. In these cases, computer-based systems can be used to facilitate this process.

Parallel Processing

Parallel processing involves using more than one computation resource to solve certain time-consuming problems. In image processing, parallelism is possible using image processing operators. Image processing is done at low, intermediate and high-levels. Parallelism is achieved by simultaneous processing by two or more processing units using one of two main approaches: 1) using parallel processing hardware, and 2) using a distributed computing/processing system.

In low-level image processing, operators act at the pixel level. The input to low-level image processing operators is an image, I(x, y), and an output image I'(x, y). In intermediate-level image processing, operators act on abstractions derived from pixels of an image. In high-level image processing, operators act to generate higher abstractions derived from intermediate-level image processing operators and are used to interpret image content. Quaternionic Hermite basis functions can be applied to a one dimensional image, a 2-D image and 3-D video using parallel processing and can be used to structure and algebraic biology for applications in DNA compression.

Applications

1D—QRS
within 1D applications, as described herein above, QRS signals such as an ECG signal 9302 illustrated in FIG. 93. May be processed using the hereinabove described compression techniques in order to provide for the more efficient transmission of ECG signals.

2D—Image

Within bilateral filter acceleration, the computational cost of a bilateral filter (BF) is too high to apply in real-time image processing tasks as the range kernel, which acts on pixel intensities making the averaging process nonlinear and computationally intensive, particularly when the spatial filter is large. Using Hermite polynomials, a BF accelerating method reduces the computational complexity from $o(r^2, n)$ to $O(n)$, where r denotes the filter size of a BF and n is the total number of pixels in an image. The running cost and memory consumption are equivalent to a constant time method and has an approximation accuracy similar to one using a trigonometric range kernel.

Image Denoising

A marginal statistical model for wavelet coefficients of images using Hermite Gaussian (HG expansion is used in view of the fact that it allows higher order moments to be incorporated in probabilistic modeling of the wavelet coefficients. The method involves choosing a finite number of terms in the HG series such that the resulting PDF matches well with the empirical PDF of the wavelet coefficients of the images and at the same time remains non-negative.

From among various possible series expansions, the one that uses Hermite polynomials, which are orthogonal with respect to the standard Gaussian function is chosen because the expansion is valid for image wavelet coefficients that do not have any compact support, and the Gaussian weight function resembles the empirical PDF. Hence there is a likelihood that the expanded PDF would have a better match with the empirical one. Other advantages to using Hermite series expansion including that it has a uniform mean square convergence, the parameters can be expressed in terms of higher order moments in closed-form, and the polynomials can be estimated recursively.

Let $w_{mn}$ represent a wavelet coefficient at spatial location (m, n) of a subband in the decomposition level 1 with a transformation matrix W applied on the true image. Let w represent the vector containing all the coefficients of a subband, wherein each coefficient $w_{mn}$ is a sample of that subband. Let $p_w(w)$ represent the PDF of the random variable w. This PDF may be expressed in terms of the Hermite polynomials, which are orthogonal with respect to a Gaussian weight function, in the form:

$$p_w(w) = \frac{(1)}{\sigma_w\sqrt{2\pi}} e^{-\left(\frac{w^2}{2\sigma_w^2}\right)} \left[1 + \sum_{r=3}^{\infty} \beta_r H_r\left(\frac{w}{\sigma_w}\right)\right]$$

Where $\sigma_w$ is the standard deviation of w and $H_r(w)$ is the Hermite polynomial of order r satisfying the recurrence relation:

$H_0(w)=1$ $H_1(w)=w$ $H_{r+1}(w)=wH_r(w)-rH_{r-1}(w)$, $r \geq 1$

The resulting PDF will be called the HG PDF and may be applied as a function in sub-band adaptive and locally adaptive minimum mean square error based noise reduction algorithms. This offers lower computational burden as compared to methods using intersub-band dependence. The performance is better than that of sub-band-adaptive and locally adaptive wavelet based image denoising algorithms that use standard PDFs with a limited number of parameters in terms of both visual perception and standard indices.

2D—Video

Video Denoising

A wavelet-domain video denoising scheme based on the Gauss-Hermite probability density function (PDF) for spatial filtering of noisy frame wavelets coefficients performs comparably to other conventional density functions such as generalized Gaussian and Bessel K-form densities. The Gauss-Hermite PDF may be used as an approximate mean square error estimator for spatial filtering. A recursive averaging filter may be used for temporal denoising. The method using the Gauss-Hermite PDF noise reduction technique results in better visual quality and peak signal to noise (PSNR) as compared to other video denoising algorithms.

Let v(i,j) represent the given subband wavelet coefficients of the kth frame of a video. Let the PDF of the random variable v denoted by $p_v(v)$ be expressed in terms of the standard Gaussian distribution that has a zero mean and variance $\sigma_v^2$. Then, in terms of the HG ddensity function, $$p_v(v) = \frac{(1)}{\sigma_v\sqrt{2\pi}} e^{-\left(\frac{v^2}{2\sigma_v^2}\right)} \left[1 + \sum_{r=3}^{\infty} \beta_r H_r\left(\frac{v}{\sigma_v}\right)\right]$$

Where the coefficients $\beta_r$ may be expressed in terms of qth order moment, $M_{qv}$ as:

$$\beta_3 = -\frac{1}{3!}\left(\frac{M_{3v}}{\sigma_v^3}\right); \beta_4 = \frac{1}{3!}\left(\frac{M_{4v}}{\sigma_v^4} - 3\right);$$

$$\beta_5 = -\frac{1}{5!}\left(\frac{M_{5v}}{\sigma_v^5} - 10\frac{M_{3v}}{\sigma_v^3}\right);$$

$$\beta_7 = -\frac{1}{6!}\left(\frac{M_{6v}}{\sigma_v^6} - 15\frac{M_{4v}}{\sigma_v^4} + 30\right); \ldots$$

and $H_r(v)$ are the Hermite polynomials.

Compression on DNA/Quaternions

Matrix forms of the multi-level system of molecular-genetic alphabets have specific algebraic properties. Families of genetic matrices have connections with functions by Walsh and Hadamard matrices which are well-known in coding and digital communication. Dyadic-shift decompositions of such genetic matrices lead to sets of sparse matrices. Each of these sets is closed in relation to multiplication and defines relevant algebra of hypercomplex numbers. In fact the genetic Hadamard matrices are identical to matrix representations of Hamilton quaternions. The above described technical components relating to compression can be applied to analysis of genetic sequences. They are discussed taking into account the important role of quaternions and other hypercomplex structures in physics. This means that living matter possesses a profound algebraic structure and it allows us to develop a new algebraic biology.

Alphabets play a basic role in communication technologies. In any communication system of "transmitter-receiver", the receiver always knows the alphabet of signals which are used by the transmitter. In linguistics, each alphabet has a complex multi-level structure because it contains sets of vowels and consonants where, in some languages, the set of vowels is divided into sub-sets of short and long sounds, and the set of consonants is divided into subsets of voiced and voiceless consonants, etc. Quantities of members in all of these parts of linguistic alphabets are not interrelated by means of known regularities of algebraic connections. However, the situation in the multi-level system of genetic alphabets is quite different: Many parts of this system are closely interconnected by means of deep algebraic regularities and formalisms which are well-known in communication technologies.

It is known that the molecular-genetic system of living matter includes the following alphabets each of which can be considered as a separate alphabet or as a part of a complex alphabetic system:

4-letter alphabet of nitrogenous bases (adenine (A), guanine (G), cytosine (C), thymine(T));
   64-letter alphabet of triplets;-2-letter alphabet of "weak and strong roots" of triplets;
   20-letter alphabet of amino acids;
   2-letter alphabet "purines vs. pyrimidines";
   2-letter alphabet "strong vs. weak hydrogen bonds"
   2-letter alphabet "keto vs. amino"

So, the molecular-genetic system is a multi-lingual system. Any sequence of nucleotides can be read from viewpoints of different genetic languages depending on the reader alphabet. It can be added that the typical expression "the genetic code" means an interrelation between elements of two of these genetic alphabets: the alphabet of triplets and the alphabet of amino acids. Quaternionic compression is the most natural basis function for compression of DNA information because there are four basis sets (A,T,C,G) connecting the sugar phosphates in DNA because there are four letter alphabets for nitrogenous bases, 64 alphabet of triplets, twenty letter alphabet of amino acids, two letter alphabet (strong and weak hydrogen bonds), one can formulate and algebraic biology with these quaternionic basis functions.

Genetic information from the micro-world of genetic molecules dictates constructions in the macro-world of living organisms under strong noise and interference. For example in Mendel's law, this dictation is realized through different independent channels by means of unknown algorithms of multi-channel noise-immunity coding.

Genetic information is transferred by means of discrete elements. General theory of signal processing utilizes the encoding of discrete signals by means of special mathematical matrices and spectral representations of signals to increase reliability and efficiency of information transfer. A typical example of such matrices is the family of Hadamard matrices. Rows of Hadamard matrices form an orthogonal system of Walsh functions which can be used for the spectral representation and transfer of discrete signals. The present system draws structural analogies between digital communication theory and genetic informatics in connection with the development of new techniques in analyzing DNA sequences. There are specific relations between matrix forms of representation of the system of genetic alphabets and multi-dimensional hypercomplex numbers.

Hypercomplex structures are widely used in digital signal processing. Formalisms of multi-dimensional vector spaces are one of basic formalisms in digital communication technologies, pattern recognition, detection of errors in the transmission of information, etc. Hadamard matrices and orthogonal systems of Walsh functions are among the most used tools for error-correcting coding information, and for many other applications in digital signal processing. Hypercomplex numbers, quaternions and their complexification (biquaternions) are widely applied in theoretical physics. Given the connection between the system of genetic alphabets with quaternions and their complexification, such structure may be leveraged for DNA analysis, compression and sequencing.

It will be appreciated by those skilled in the art having the benefit of this disclosure that this compression of signals images and video in multi-media, communications and other applications provides an improved method for compression of images and video data for transmission. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for transmitting compressed image data comprising:
   receiving image data representing an image;
   minimizing a space-spatial frequency product of the image data by applying a predetermined Hermite-Gaussian function thereto to generate a minimized mathematical representation of the image data, wherein the minimized space-spatial frequency product of the image data equals ½;
   extracting coefficients contained within the generated minimized mathematical representation of the image data;
   transmitting the extracted coefficients of the minimized mathematical representation of the image data without any remaining portions of the minimized mathematical representation of the image data from a first location to a second location;
   recreating the minimized mathematical representation of the image data comprising the minimized space-spatial frequency product of the image data at the second location responsive to the transmitted extracted coefficients and the predetermined Hermite-Gaussian function stored at the second location; and
   generating the image from the recreated minimized mathematical representation of the image data comprising the space-spatial frequency product of the image data.

2. The method of claim 1, wherein the image data comprises video data.

3. The method of claim 1, wherein the step of minimizing further comprises generating the minimized mathematical representation of the image data responsive to the Hermite-Gaussian function and at least one of complex moments and geometric moments.

4. The method of claim 1, wherein the step of minimizing further comprises minimizing the space-spatial frequency of the image data by applying a waveletized version of the Hermite-Gaussian function to generate the minimized mathematical representation of the image data.

5. The method of claim 1, wherein the step of minimizing further comprises:
   determining each pixel represented in the received image data;
   determining a central moment of the image from the received image data;
   determining a moment reference of each pixel to the central moment of the image; and
   generating the mathematical representation of the image data from the determined moments of reference for each of the pixels.

6. The method of claim 1, wherein the step of minimizing further comprises compressing color data represented by the image data.

7. The method of claim 6, wherein the predetermined Hermite-Gaussian function further comprises a quaternionic Hermite-Gaussian Function.

8. The method of claim 7, wherein the minimization by applying the quaternionic Hermite-Gaussian function further applies a quaternion Fourier transform to the image data.

9. The method of claim 7, wherein the step of compressing color data further comprises:
   assigning red color data of RGB data to a first component of the quaternionic Hermite-Gaussian Function;
   assigning green color data of the RGB data to a second component of the quaternionic Hermite-Gaussian Function; and assigning blue color data of the RGB data to a third component of the quaternionic Hermite-Gaussian Function.

10. The method of claim 6, wherein the step of compressing further comprises:
converting RGB color data into luma data and chroma data;
assigning the luma data to a first component of the predetermined Hermite-Gaussian function; and
assigning the chroma data to at least one of a second component and component of the predetermined Hermite-Gaussian function.

11. The method of claim 1, wherein the step of minimizing further comprises decomposing the image data using a quaternionic singular value decomposition.

12. A system for transmitting compressed image data, comprising:
an encoder, responsive to received image data representing an image, for minimizing a space-spatial frequency product of the image data by applying a predetermined Hermite-Gaussian function thereto to generate a minimized mathematical representation of the image data, wherein the minimized space-spatial frequency product of the image data equals ½, the encoder further extracting coefficients of the minimized mathematical representation of the image data;
a transmitter for transmitting the coefficients of the minimized mathematical representation of the image data without any remaining portions of the minimized mathematical representation of the image data from a first location to a second location;
a receiver for receiving the transmitted extracted coefficients of the minimized mathematical representation of the image data at the second location from the first location; and
a decoder for recreating the minimized mathematical representation of the image data comprising the minimized space-spatial frequency product of the image data at the second location responsive to the received extracted coefficients and the predetermined Hermite-Gaussian function that is stored at the decoder and generating the image data from the recreated minimized mathematical representation of the image data comprising the space-spatial frequency product of the image data.

13. The system of claim 12, wherein the image data comprises video data.

14. The system of claim 12, wherein the encoder further generates the minimized mathematical representation of the image data responsive to the Hermite-Gaussian function and at least one of complex moments and geometric moments.

15. The system of claim 12, wherein the encoder further minimizes the space-spatial frequency of the image data by applying a waveletized version of the Hermite-Gaussian function to generate the minimized mathematical representation of the image data.

16. The system of claim 12, wherein the encoder further determines each pixel represented in the received image data, determines a central moment of the image from the image data, determines a moment reference of each pixel to the central moment of the image and generates the minimized mathematical representation of the image data from the determined moments of reference for each of the pixels.

17. The system of claim 12, wherein the encoder further compresses color data represented by the image data.

18. The system of claim 17, wherein the predetermined Hermite-Gaissian function further comprises a quaternionic Hermite-Gaussian Function.

19. The system of claim 18, wherein the encoder applies a quaternion Fourier transform to the image data.

20. The system of claim 18, wherein the encoder further assigns red color data of RGB data to a first component of the quaternionic Hermite-Gaussian Function, assigns green color data of the RGB data to a second component of the quaternionic Hermite-Gaussian Function and assigns blue color data of the RGB data to a third component of the quaternionic Hermite-Gaussian Function.

21. The system of claim 17, wherein the encoder further converts RGB color data into luma and chroma data, assigns the luma data to a first component of the predetermined Hermite-Gaussian and assigns the chroma data to at least one of a second component and third component of the predetermined Hermite-Gaussian function.

22. The system of claim 12, wherein the encoder decomposes the image data using a quaternionic singular value decomposition.

23. A method for transmitting compressed video data comprising:
receiving video data representing a video, the video data representing color data for each pixel making up the video;
processing the video data by applying a predetermined hyper-complex quaternion Hermite-Gaussian function thereto to generate a minimized mathematical representation of the video data, wherein the step of processing further comprises:
assigning red color data of RGB data to a first component of the hyper-complex quaternion Hermite-Gaussian function;
assigning green color data of the RGB data to a second component of the hyper-complex quaternion Hermite-Gaussian function;
assigning blue color data of the RGB data to a third component of the hyper-complex quaternion Hermite-Gaussian function;
assigning a zero value to a forth component of the hyper-complex quaternion Hermite-Gaussian function;
extracting coefficient contained within the generated minimized mathematical representation of the video data;
transmitting the extracted coefficients of the minimized mathematical representation of the video data from without any remaining portion of the minimized mathematical representation of the image data from a first location to a second location;
recreating the minimized mathematical representation of the video data at the second location responsive to the transmitted extracted coefficients and the three components assigned to the red, green and blue color data of the predetermined hyper-complex quaternian Hermite-Gaussian function stored at the second location; and
generating the video from the recreated minimized mathematical representation of the video data.

24. A method for transmitting compressed image data comprising:
receiving image data representing an image;
processing each pixel of each frame of the image data to determine moments to minimize a space-spatial frequency product of the image data and generate a minimized mathematical representation of the image data responsive to a predetermined Hermite-Gaussian function, wherein the minimized space-spatial frequency product of the image data equals ½;

extracting coefficients from the minimized mathematical representation of the image data;

transmitting the extracted coefficients of the minimized mathematical representation of the image data without any remaining portions of the mathematical representation of the image data from a first location to a second location;

recreating the minimized mathematical representation of the image data comprising the minimized space-spatial frequency product of the image data at the second location responsive to the transmitted extracted coefficients and the predetermined Hermite-Gaussian function stored at the second location; and generating the image from the recreated minimized mathematical representation of the image data comprising the minimized space-spatial frequency product of the image data.

25. The method of claim 24, wherein the step of processing further comprises:

determining each pixel represented in the received video data;

determining a central moment of an image from the video data;

determining a moment reference of each pixel to the central moment of the image; and generating the minimized mathematical representation of the video data from the determined moments of reference for each of the pixels.

\* \* \* \* \*